US009171184B2

(12) United States Patent
Nagase et al.

(10) Patent No.: US 9,171,184 B2
(45) Date of Patent: Oct. 27, 2015

(54) TRANSMISSION TERMINAL, TRANSMISSION SYSTEM AND RECORDING MEDIUM

(71) Applicants: Tatsuya Nagase, Kanagawa (JP); Hiroaki Uchiyama, Kanagawa (JP); Yoshinaga Kato, Kanagawa (JP)

(72) Inventors: Tatsuya Nagase, Kanagawa (JP); Hiroaki Uchiyama, Kanagawa (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 14/048,194

(22) Filed: Oct. 8, 2013

(65) Prior Publication Data

US 2014/0101721 A1    Apr. 10, 2014

(30) Foreign Application Priority Data

Oct. 10, 2012 (JP) .................................. 2012-225101
Jun. 18, 2013 (JP) .................................. 2013-127512

(51) Int. Cl.
G06F 21/70  (2013.01)

(52) U.S. Cl.
CPC ..................................... *G06F 21/70* (2013.01)

(58) Field of Classification Search
None
See application file for complete search history.

(56) References Cited

U.S. PATENT DOCUMENTS

| | | | | |
|---|---|---|---|---|
| 6,643,777 | B1 * | 11/2003 | Chu | 726/16 |
| 7,770,205 | B2 * | 8/2010 | Frank | 726/2 |
| 8,112,601 | B2 * | 2/2012 | Al-Azzawi | 711/163 |
| 8,250,379 | B2 * | 8/2012 | Thom et al. | 713/193 |
| 8,271,790 | B2 * | 9/2012 | Rosenan et al. | 713/176 |
| RE44,654 | E  * | 12/2013 | Chu | 726/16 |
| 8,719,909 | B2 * | 5/2014 | Fitzgerald et al. | 726/7 |
| 8,726,407 | B2 * | 5/2014 | Etchegoyen | 726/34 |
| 2004/0187038 | A1 | 9/2004 | Yachida | |
| 2005/0050339 | A1 * | 3/2005 | Himmel et al. | 713/189 |
| 2008/0059743 | A1 * | 3/2008 | Bychkov et al. | 711/163 |

FOREIGN PATENT DOCUMENTS

JP      2004-303215       10/2004

\* cited by examiner

*Primary Examiner* — Benjamin Lanier
(74) *Attorney, Agent, or Firm* — Oblon, McClelland, Maier & Neustadt, L.L.P.

(57) ABSTRACT

A transmission terminal includes an authentication unit that determines, when the transmission terminal is not connected to a network, whether authentication of a storage medium is confirmed based on authentication information stored in a storage unit and authentication information read from the storage medium, and transmits, when the transmission terminal is connected to the network, an authentication request containing the authentication information read from the storage medium to an authentication device connected to the network, and a maintenance unit that alters maintenance functions executable on the transmission terminal based on whether authentication of the storage medium is confirmed based on the authentication information stored in the storage unit or a notice indicating that authentication of the storage medium is confirmed is received from the authentication device.

16 Claims, 20 Drawing Sheets

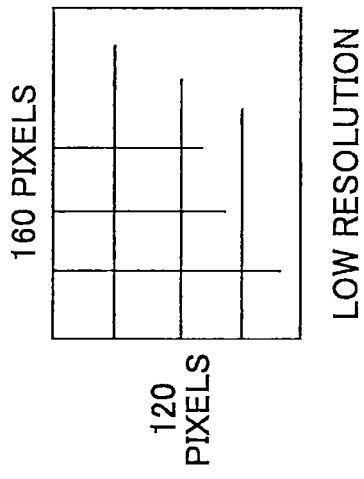
FIG.6A — 160 PIXELS × 120 PIXELS — LOW RESOLUTION
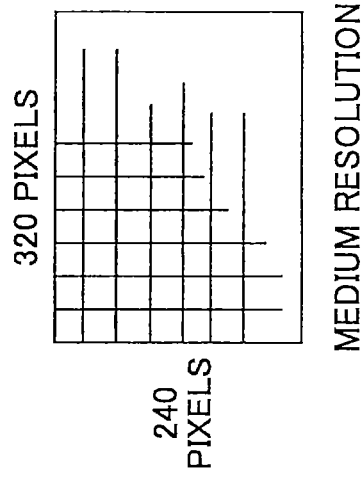
FIG.6B — 320 PIXELS × 240 PIXELS — MEDIUM RESOLUTION
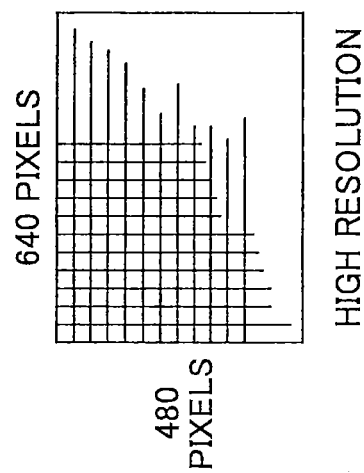
FIG.6C — 640 PIXELS × 480 PIXELS — HIGH RESOLUTION

FIG.7

| IP ADDRESS OF RELAY DESTINATION TERMINAL | IMAGE QUALITY OF RELAYED VIDEO DATA |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

| RELAY DEVICE ID | OPERATING STATE | RECEIPT DATE/TIME | IP ADDR. OF RELAY DEVICE | MAX. DATA TX SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

| TERMINAL ID | PASSWORD |
|---|---|
| 01aa | aaaa |
| 01ab | abab |
| 01ba | baba |
| ... | ... |

| TERMINAL ID | OPERATING STATE | RECEIPT DATE/TIME | IP ADDR. OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

| SESSION ID | RELAY DEVICE ID | REQUEST SOURCE TRML ID | DESTINATION TERMINAL ID | DELAY TIME (ms) | DELAY INFO RECEIPT DATE/TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

| DIFFERENCE PATTERN OF DOT ADDRESS | ADDRESS PRIORITY |
|---|---|
| Y.Y.Y.N | 5 |
| Y.Y.N.— | 3 |
| Y.N.—.— | 1 |
| N.—.—.— | 0 |

| MAX DATA TX SPEED OF RELAY DEVICE (Mbps) | TX SPEED PRIORITY |
|---|---|
| 1000~ | 5 |
| 100~1000 | 3 |
| 10~100 | 1 |
| ~10 | 0 |

| DELAY TIME (ms) | IMAGE QUALITY OF VIDEO DATA |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTED) |

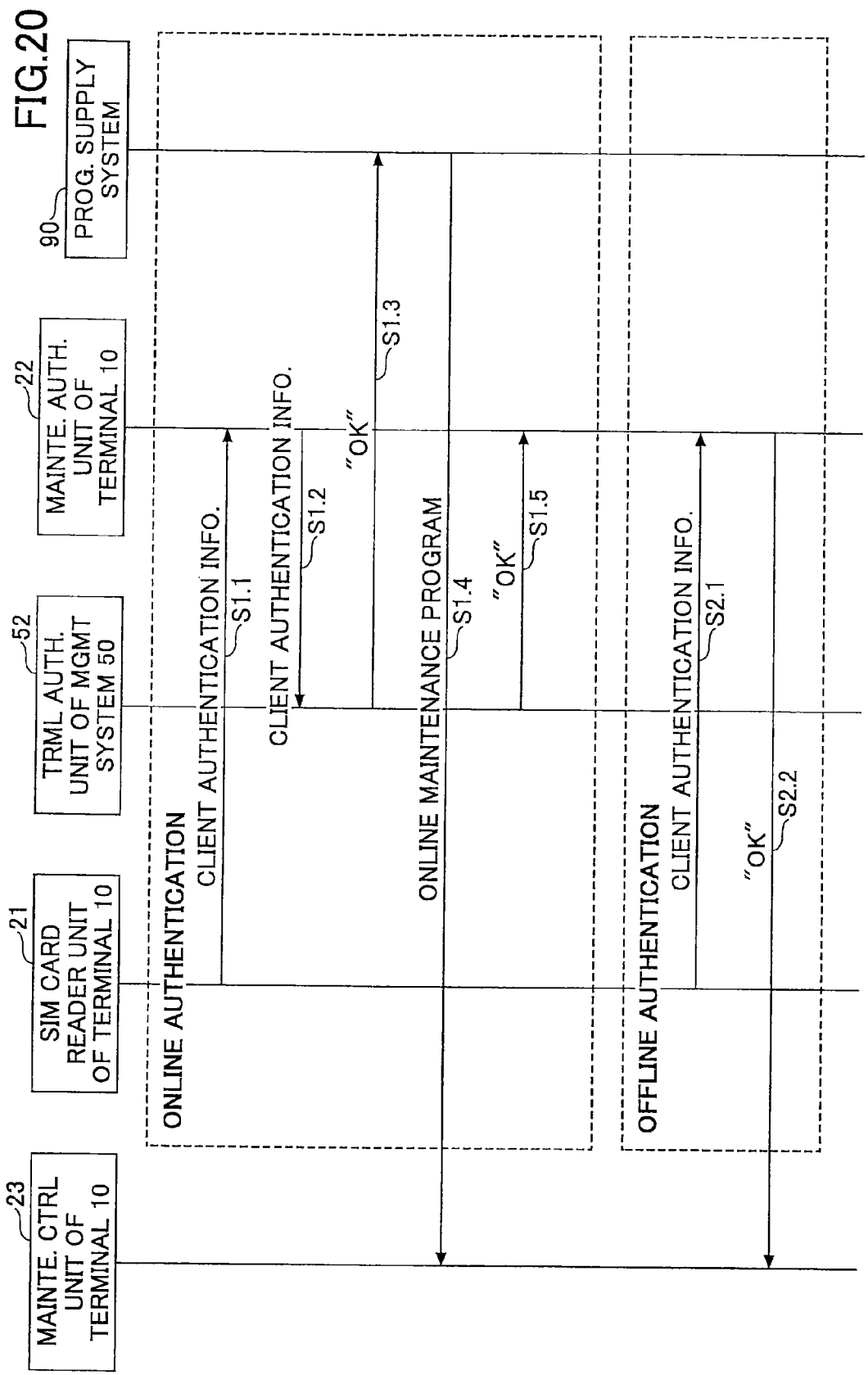

TRANSMISSION TERMINAL, TRANSMISSION SYSTEM AND RECORDING MEDIUM

BACKGROUND OF THE INVENTION

1. Field of the Invention

The present invention relates to a transmission terminal to transmit and receive image data and voice data to and from a device connected to the transmission terminal via a network.

2. Description of the Related Art

In recent years, a videoconference system to conduct videoconferences between remote places via communication networks, such as the Internet, is becoming increasingly popular.

Videoconferencing is communication with others using video and audio software and hardware to see and hear each other. To conduct such a videoconference, the videoconference system uses transmission terminals (which may also be referred to as "terminals") which are arranged in a conference room of one of the remote places where persons concerned, such as attendants of the videoconference, are present. Each of the transmission terminals collects voices of the persons concerned, such as discussions in the videoconference, and captures images of the conference room and the persons concerned, converts the voices and the images into digital data, and transmits the digital data to the other party's transmission terminal via a network, such as the Internet. The digital data is received at a transmission terminal of the other party's conference room, and the received data is reproduced and output by a speaker and a display device of the transmission terminal as image data and audio data. In this manner, the videoconference is conducted between the remote places in the conditions closely resembling reality.

In the videoconference system of this kind, all transmission terminals and a video delivery server which participate in a videoconference are connected together. The video delivery server controls distribution of image data and audio data to the respective transmission terminals, and the videoconference may be implemented as a multipoint distribution service.

One of the major problems arising on the transmission terminals in the videoconference system is that image data and voice data are not transmitted correctly. Causes of the problem may include a fault of the transmission terminal hardware, a fault of the transmission lines between the transmission terminals and the video delivery server through the Internet, or a lack of network bandwidth capacity needed for conducting the videoconference.

To perform troubleshooting of each of the transmission terminals, the following methods may be used. A user may check the content of a fault of the transmission terminal concerned by executing a self-diagnosis function of the transmission terminal. A service person may visit the site of a user and check a defective transmission terminal body. If the service person cannot discover a fault of the transmission device on the site, the transmission device may be carried to a service center of a manufacturer and troubleshooting of the defective transmission device may be performed by analysis using a special maintenance tool.

However, from the reasons of security and quality assurance, use of some of maintenance functions for finding out faults of terminal devices is restricted only to authorized service persons. For example, see Japanese Laid-Open Patent Publication No. 2004-303215. Japanese Laid-Open Patent Publication No. 2004-303215 discloses an electronic device where a level of maintenance which is permitted to be conducted is set beforehand. The electronic device includes an authentication unit which authenticates a person who intends to conduct maintenance of the electronic device, and an alteration unit which temporarily allows maintenance in response to an altering instruction if the person who intends to conduct maintenance of the electronic device is authenticated by the authentication unit.

In this connection, there are two authentication methods that are used to authenticate a service person in order to permit the service person to conduct maintenance of a device: online authentication and offline authentication. Online authentication is an authentication method by which service persons are authenticated by a server connected to the device via a network. Offline authentication is an authentication method by which service persons are locally authenticated without using communication via a network.

The security levels at which the two authentication methods are used are different from each other, and it is preferred that the maintenance range permitted for service persons when the offline authentication is used is more limited than that when the online authentication is used. However, in the maintenance of the conventional electronic devices according to the related art including Japanese Laid-Open Patent Publication No. 2004-303215, there is no definition or indication of the maintenance range when the offline authentication is used and of the maintenance range when the online authentication is not available.

SUMMARY OF THE INVENTION

In one aspect, the present invention provides a transmission terminal which is able to alter maintenance functions executable on the transmission terminal based on whether an online authentication sequence is performed or an offline authentication sequence is performed when starting a maintenance operation on the transmission terminal.

In an embodiment which solves or reduces one or more of the above-described problems, the present invention provides a transmission terminal that transmits and receives image data and voice data to and from a device connected to the transmission terminal via a network, the transmission terminal including: a network connection unit configured to connect the transmission terminal to the network; a storage-medium interface to which a storage medium is detachably attached; a first storage unit configured to store authentication information for authenticating the storage medium; an authentication information reading unit configured to read authentication information from the storage medium attached to the storage-medium interface; an authentication unit configured to determine, when the transmission terminal is not connected to the network by the network connection unit, whether authentication of the storage medium is confirmed based on the authentication information stored in the first storage unit and the authentication information read from the storage medium, and configured to transmit, when the transmission terminal is connected to the network by the network connection unit, an authentication request containing the authentication information read from the storage medium to an authentication device connected to the network; and a maintenance unit configured to alter maintenance functions executable on the transmission terminal, based on whether the authentication of the storage medium is confirmed based on the authentication information stored in the first storage unit or a notice indicating that the authentication of the storage medium is confirmed is received from the authentication device.

Other objects, features and advantages of the invention will become more apparent from the following detailed description when read in conjunction with the accompanying drawings.

BRIEF DESCRIPTION OF THE DRAWINGS

FIGS. 6A, 6B and 6C are diagrams showing image quality of image data.

FIG. 7 is a diagram showing an altered quality management table.

FIG. 8 is a diagram showing a relay-device management table.

FIG. 9 is a diagram showing a terminal authentication management table.

FIG. 10 is a diagram showing a terminal management table.

FIG. 11 is a diagram showing a destination list management table.

FIG. 12 is a diagram showing a session management table.

FIG. 13 is a diagram showing an address priority management table.

FIG. 14 is a diagram showing a transmission speed priority management table.

FIG. 15 is a diagram showing a quality management table.

FIG. 20 is a sequence diagram for explaining online authentication and offline authentication.

DETAILED DESCRIPTION OF THE PREFERRED EMBODIMENTS

A description will be given of embodiments of the invention with reference to the accompanying drawings.

Figure 1:
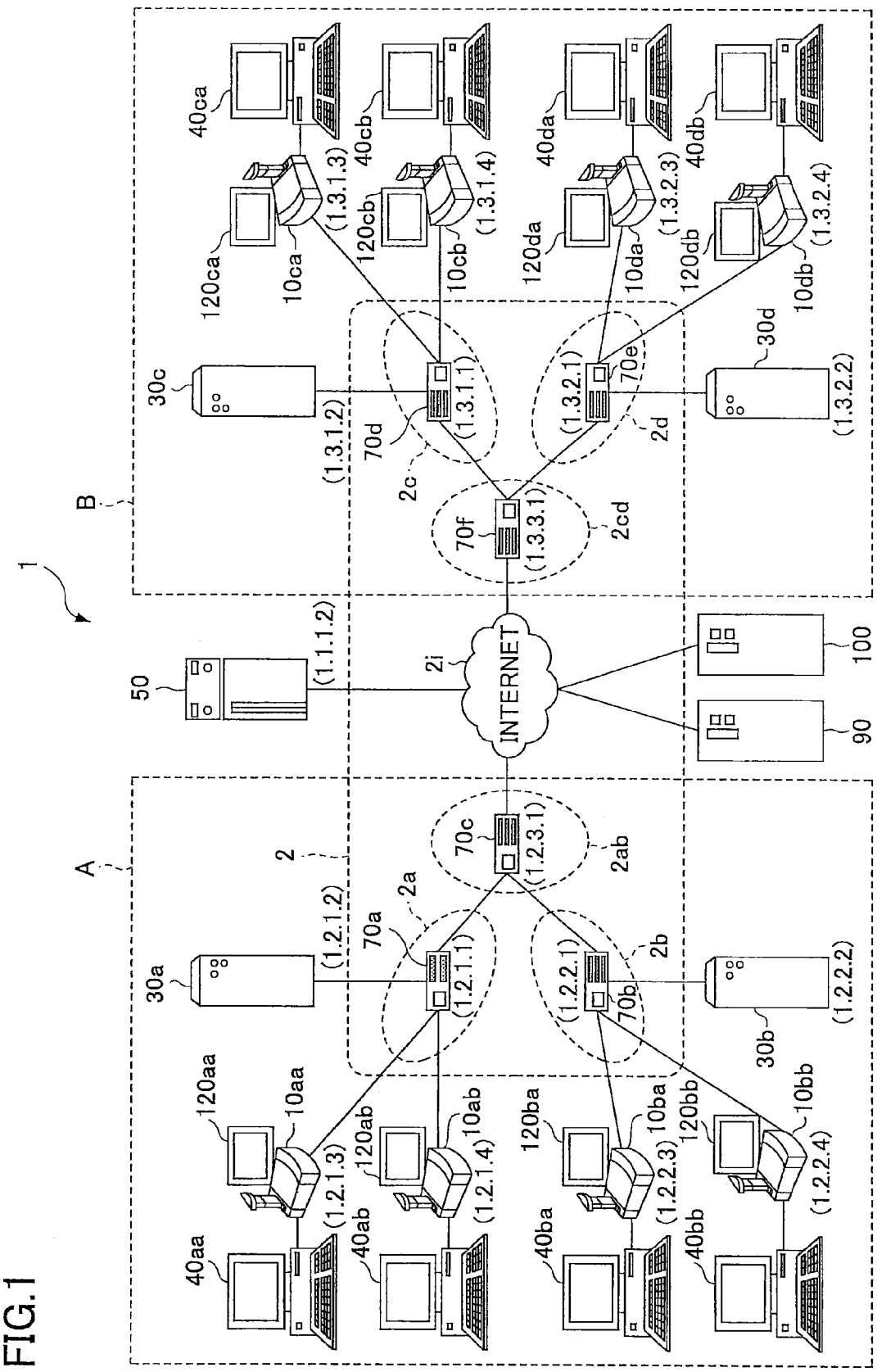
FIG. 1 is a diagram showing a transmission system according to an embodiment of the invention.

FIG. 1 is a diagram of a transmission system 1 according to an embodiment of the invention. First of all, an outline of the transmission system 1 according to the embodiment will be described with reference to FIG. 1.

There are various types of transmission systems. One example may be a data providing system. In the data providing system, content data are transmitted from one terminal to another terminal via a transmission management system in a one-way direction. Another example may be a communication system. In the communication system, information or emotional expressions are mutually communicated among two or more transmission terminals via the transmission management system. The communication system is utilized for mutually exchanging information or emotional expressions among the two or more communication terminals (i.e., the transmission terminals) via a communication management system (i.e., the transmission management system). Examples of the communication system include a videoconference system, a videophone system, an audio conference system, a voice-call system, or a personal computer screen sharing system.

The following embodiments describe the transmission system, the transmission management system, and the transmission terminal by conceptualizing the videoconference system as an example of the communication system, the videoconference management system as an example of the communication management system, and the videoconference terminal as an example of the communication terminal. That is, the transmission terminal and the transmission management system utilized in the embodiments may be applied not only to the videoconference system, but may also be applied to the communication system or the transmission system.

As shown in FIG. 1, the transmission system 1 includes two or more transmission terminals (10*aa*, 10*ab*, . . . , 10*db*), displays (120*aa*, 120*ab*, . . . , 120*db*) for the transmission terminals (10*aa*, 10*ab*, . . . , 10*db*), two or more relay devices (30*a*, 30*b*, 30*c*, 30*d*), a transmission management system 50, a program supply system 90, and a maintenance system 100.

Note that in this embodiment, any one of the transmission terminals (10*aa*, 10*ab*, . . . , 10*db*) may be referred to as "transmission terminal 10", any one of the displays (120*aa*, 120*ab*, . . . , 120*db*) may be referred to as "display 120", and any one of the relay devices (30*a*, 30*b*, 30*c*, 30*d*) may be referred to as "relay device 30". Note that in the following, the transmission terminal and the transmission management system may also be simply referred to as the "terminal" and the "management system", respectively.

The transmission terminal 10 is configured to transmit and receive image data, voice data, etc. to and from another transmission terminal 10. Note that in this embodiment, a case in where the image data is moving-picture image data will be explained. However, the transmission terminal 10 may be configured to transmit and receive still-picture image data. Alternatively, the image data may include both moving-picture image data and still-picture image data. The relay device 30 is configured to relay the image data and the voice data among the transmission terminals 10. The transmission management system 50 is configured to manage the transmission terminal 10 and the relay device 30 in an integrated manner.

The external input device 40 is connected to the transmission terminal 10 and configured to transmit document data to the transmission terminal 10 for displaying the document data. For example, the document data is data which is used by document creation software, spreadsheet software, presentation software, etc.

Routers (70*a*, 70*b*, . . . , 70*f*) shown in FIG. 1 are configured to select optimal paths for the image data and the voice data. Note that in this embodiment, any one of the routers (70*a*, 70*b*, . . . , 70*f*) may be referred to as "router 70". The program supply system 90 includes a not-illustrated hard disk (HD) configured to store programs for a terminal, with which the transmission terminal 10 may implement various functions or various units, and transmit the programs to the transmission terminal 10. The HD of the program supply system 90 is configured to further store programs for a relay device, with which the relay device 30 implements various functions or various units, and transmit the programs for the relay device to the relay device 30. In addition, the HD of the program supply system 90 is configured to store transmission management programs, with which the transmission management system 50 implements various functions or various units, and transmit the transmission management programs to the transmission management system 50.

As shown in FIG. 1, the transmission terminal 10aa, the transmission terminal 10ab, the relay device 30a, and the router 70a are connected via a LAN 2a so that they may communicate with each other. The transmission terminal 10ba, the transmission terminal 10bb, the relay device 30b, and the router 70b are connected via a LAN 2b so that they may communicate with each other. The LAN 2a and the LAN 2b are connected by a dedicated line 2ab including a router 70c so that they communicate with each other, and the LAN 2a and the LAN 2b are set up in a predetermined area A. For example, the area A may be Japan, the LAN 2a may be set up in an office in Tokyo, and the LAN 2b may be set up in an office in Osaka.

Meanwhile, the transmission terminal 10ca, the transmission terminal 10cb, the relay device 30c, and the router 70d are connected via a LAN 2c so that they may communicate with each other. The transmission terminal 10da, the transmission terminal 10db, the relay device 30d, and the router 70e are connected via a LAN 2d so that they may communicate with each other. The LAN 2c and the LAN 2d are connected by a dedicated line including a router 70f so that they communicate with each other, and the LAN 2c and the LAN 2d are set up in predetermined area B. For example, the area B may be USA, the LAN 2c may be is set up in an office in New York, and the LAN 2d may be set up in an office in Washington, D.C. The area A and the area B are connected from the routers 70c and 70f via the Internet 2i so that the area A and the area B are mutually in communication via the Internet 2i.

The transmission management system 50 and the program supply system 90 are connected to the transmission terminal 10 and the relay device 30 via the Internet 2i so that they may communicate with each other. Alternatively, the transmission management system 50 and the program supply system 90 may be located in the area A or the area B, or may be located in an area other than the areas A and B.

Note that in this embodiment, a communication network 2 is made up of the LAN 2a, the LAN 2b, the dedicated line 2ab, the Internet 2i, the dedicated line 2cd, the LAN 2c, and the LAN 2d. In the communication network 2 of FIG. 1, the set of four numbers attached under each of the transmission terminal 10, the relay device 30, the transmission management system 50, the router 70, and the program supply system 90 simply indicates an IP address under the typical IPv4 (Internet Protocol version 4). For example, the IP address of the transmission terminal 10aa is "1.2.1.3" as shown in FIG. 1. Alternatively, the IP addresses under the IPv6 may be used instead of the IP addresses under the IPv4. However, in this embodiment, the IPv4 is used for simplifying the illustration.

[Hardware Configuration of Embodiment]

Figure 2:
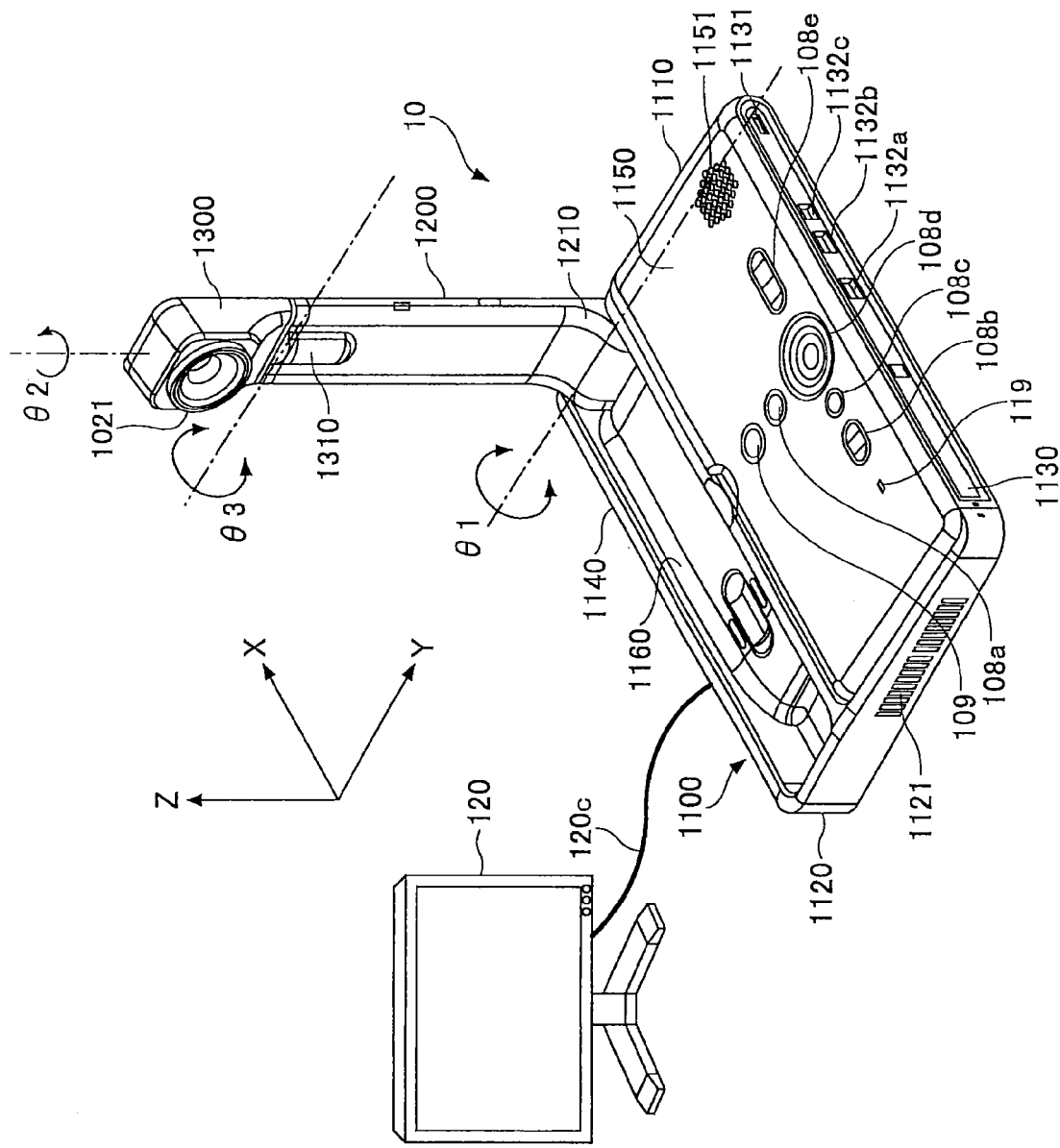
FIG. 2 is a perspective view of a transmission terminal according to the embodiment.
Figure 3:
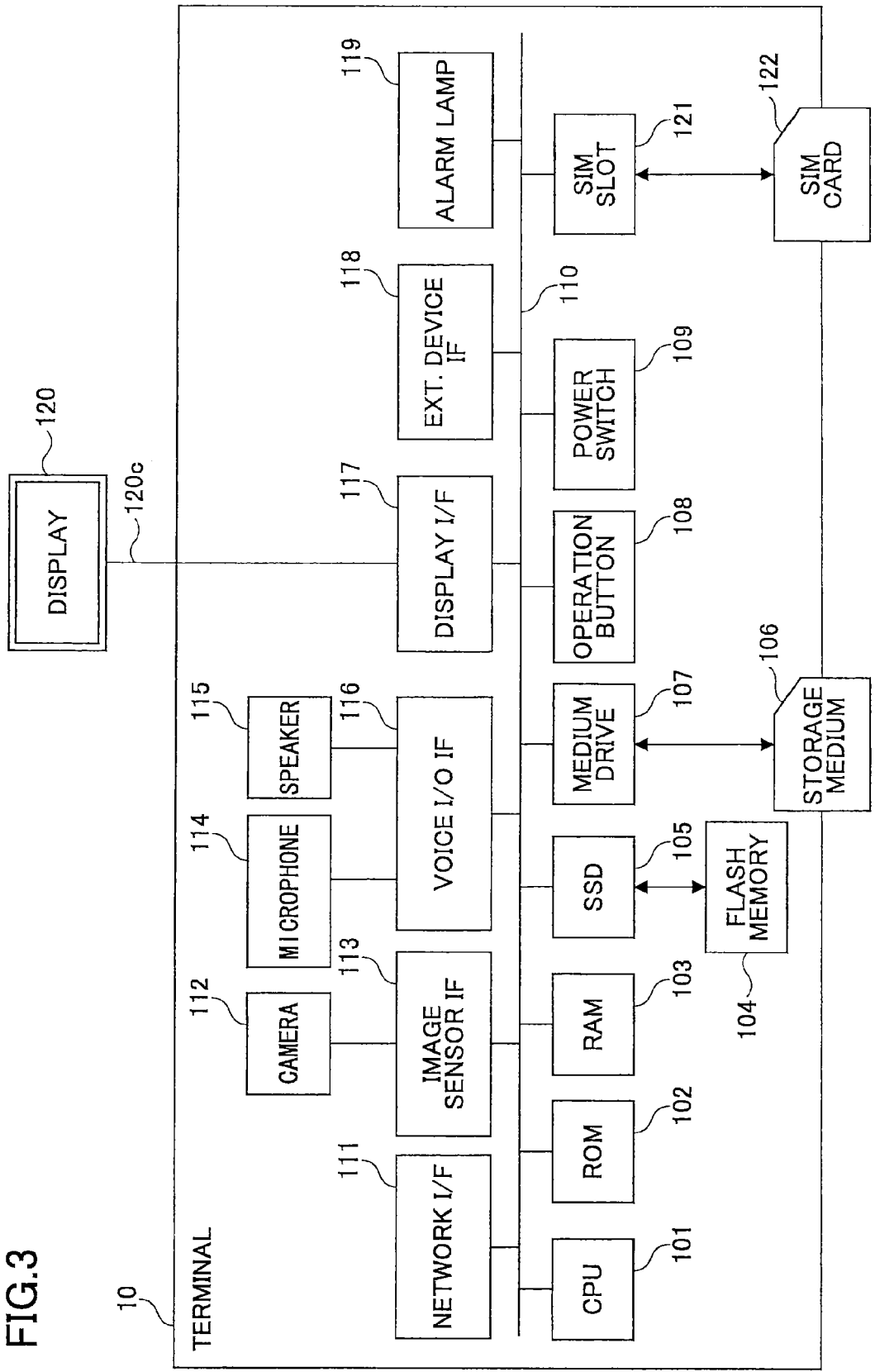
FIG. 3 is a diagram showing a hardware configuration of the transmission terminal according to the embodiment.

Next, a hardware configuration of the transmission system 1 according to the embodiment will be described. FIG. 2 is a perspective view of the transmission terminal 10 according to the embodiment. FIG. 3 is a diagram showing a hardware configuration diagram of the transmission terminal 10 according to the embodiment. Hereinafter, an X-axis direction represents a longitudinal direction of the transmission terminal 10, a Y-axis direction represents a direction perpendicular to the X-axis direction in a horizontal direction, and a Z-axis direction represents a direction perpendicular to the X-axis direction and the Y-axis direction (i.e., vertical direction).

As shown in FIG. 2, the transmission terminal 10 includes a housing 1100, an arm 1200, and a camera housing 1300. A front wall face 1110 of the housing 1100 includes a not-illustrated air intake surface which is formed of air intake holes, and a rear wall face 1120 of the housing 110 includes an exhaust surface 1121 which is formed of exhaust holes. Accordingly, the transmission terminal 10 may take in external air behind the transmission terminal 10 via the not-illustrated air intake surface and exhaust the air inside the transmission terminal 10 via the exhaust surface 1121 by driving a cooling fan arranged inside the housing 1100. A right wall face 1130 of the housing 1100 includes a sound-collecting hole 1131, via which a built-in microphone 114 (see FIG. 3) is able to collect audio sound, such as voice, sound, or noise.

The right wall face 1130 of the housing 1100 includes an operation panel 1150. The operation panel 1150 includes operation buttons (108a-108e), a later-described power switch 109, a later-described alarm lamp 119, and a sound output face 1151 formed of sound output holes for outputting sound from a later-described built-in speaker 115. Further, a left wall face 1140 of the housing 1100 includes a recessed seat unit 1160 for accommodating an arm 1200 and a camera housing 1300. The right wall face 1130 of the housing 1100 further includes connection ports (1132a-1132c) for electrically connecting cables to the later-described external device connection IF (interface) 118. On the other hand, the left wall face 1140 of the housing 1100 further includes a not illustrated connection port for electrically connecting a display connecting cable 120c for the display 120 to the later-described external device connection IF (interface) 118. For example, the display connecting cable 120c may be a cable for analog RGB (VGA) signals, a cable for component video signals, or a cable for HDMI® (high-definition multimedia interface) signals or DVI (digital video interactive) signals.

Note that in the following, any one of the operation buttons (108a-108e) may be called an "operation button 108" and any one of the connection ports (1132a-1132c) may be called a "connection port 1132".

Next, the arm 1200 is attached to the housing 1100 via a torque hinge 1210 such that the arm 120 is movable in upward and downward directions within a tilt-angle θ1 range of 135 degrees with respect to the housing 1100. The arm 1200 shown in FIG. 2 is arranged at a tilt angle θ1 of 90 degrees.

A built-in camera 1021 is arranged in the camera housing 1300 and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotatably attached to the arm 1200 in the up/down and right/left directions via the torque hinge 1310 such that the camera housing 1300 is movable in a pan-angle θ2 range of ±180 degrees and a tilt-angle θ3 range of ±45 degrees based on the assumption that the pan and tilt angles shown in FIG. 2 are both 0.

Note that it is not necessary to have the camera, the microphone and the speaker built in the transmission terminal 10, and the camera, the microphone and the speaker may be externally attached to the transmission terminal 10. The transmission terminal 10 may be any one of a PC, a smart phone, a tablet terminal, a mobile phone, etc.

Note that external appearances of the relay device 30, the management system 50, and the program supply system 90 are all similar to the appearance of a typical server computer, and their descriptions are therefore omitted.

Figure 4:
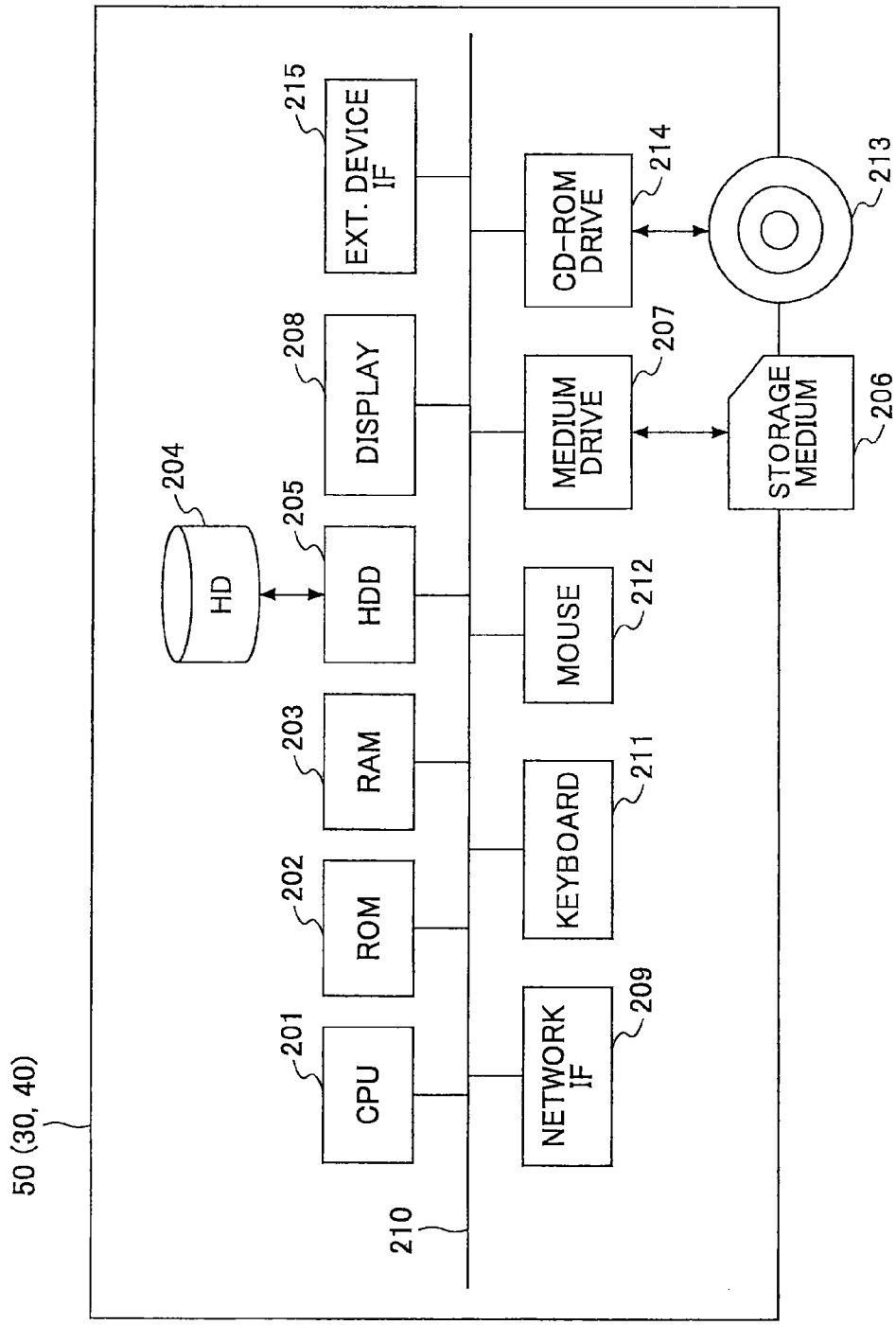
FIG. 4 is a diagram showing a hardware configuration of a transmission management system, a relay device, a program supply server or an external input device according to the embodiment.

FIG. 4 is a diagram showing a hardware configuration of the transmission management system 50 according to an embodiment of the invention. The transmission management system 50 (which will be called the management system 50) includes a central processing unit (CPU) 201 configured to control overall operations of the management system 50, a read-only memory (ROM) 202 storing programs for the transmission management, a random access memory (RAM) 203 used as a work area of the CPU 201, a hard disk (HD) 204 configured to store various data, a hard disk drive (HDD) 205 configured to control retrieval and writing (storing) of the various data in the HD 204 based on the control of the CPU, a medium drive 207 configured to control retrieval and writing (storing) of data into a storage medium 206 such as a flash memory, a display 208 configured to display various information such as a cursor, menus, windows, characters and images, a network IF (interface) 209 for transmitting data using the later-described communication network 2, a keyboard 211 for inputting characters, numerals and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, an external device IF (interface) 215 configured to transmit and receive information to and from an external device, and a bus line 210 such as an address bus or a data bus for electrically connecting the elements and devices with one another as shown in FIG. 4.

Note that the above-described transmission management program may be recorded in an installable format or in an executable format on a computer-readable recording medium such as the storage medium 206 or the CD-ROM 213 to distribute such a recording medium.

Further, the external input device 40 includes a hardware configuration similar to that of the above-described management system 50, and a description of the hardware configuration of the external input device 40 is therefore omitted. Note that the ROM 202 stores programs for controlling the external input device 40. In this case, the programs for controlling the external input device may also be recorded in an installable format or in an executable format on a computer-readable recording medium such as the storage medium 206 or the CD-ROM 213 to distribute such a recording medium.

Further, the relay device 30 includes a hardware configuration similar to that of the above-described management system 50, and a description of the hardware configuration of the relay device 30 is therefore omitted. Note that the ROM 202 stores programs for controlling the relay device 30. In this case, the programs for the relay device may also be recorded in an installable format or in an executable format on a computer-readable recording medium such as the storage medium 206 or the CD-ROM 213 to distribute such a recording medium.

Further, the program supply system 90 includes a hardware configuration similar to that of the above-described management system 50, and a description of the hardware configuration of the program supply system 90 is therefore omitted. Note that the ROM 202 stores programs for controlling the program supply system 90. In this case, the programs for the program supply system may also be recorded in an installable format or in an executable format on a computer-readable recording medium such as the storage medium 206 or the CD-ROM 213 to distribute such a recording medium.

Further, the maintenance system 100 is a computer configured to maintain or manage at least one of the terminal 10, the relay device 30, the management system 50, and the program supply system 90. For example, if the maintenance system 100 is domestically located while the terminal 10, the relay device 30, the management system 50 or the program supply system 90 is located abroad, the maintenance system 100 remotely maintains or manages at least one of the terminal 10, the relay device 30, the management system 50, and the program supply system 90 via the communication network 2. Further, the maintenance system 100 performs maintenance, such as the management of a model number, a manufacturer's serial number, a sales destination, a maintenance inspection, and a failure history, on at least one of the terminal 10, the relay device 30, the management system 50, and the program supply system 90, without utilizing the communication network 2.

Further, the maintenance system 100 includes a hardware configuration similar to that of the above-described management system 50, and a description of the hardware configuration of the maintenance system 100 is therefore omitted. Note that the HD 204 stores programs for controlling the maintenance system 100. In this case, the programs for controlling the maintenance system 100 may also be recorded in an installable format or in an executable format on a computer-readable recording medium such as the storage medium 206 or the CD-ROM 213 to distribute such a recording medium. Alternatively, the programs for controlling the maintenance system 100 may be stored in the ROM 202, instead of the HD 204.

Note that other examples of the removable recording medium include a compact disc recordable (CD-R), a digital versatile disk (DVD), and a Blue-ray Disc (BD).

[Functional Configuration of Embodiment]

Figure 5A:
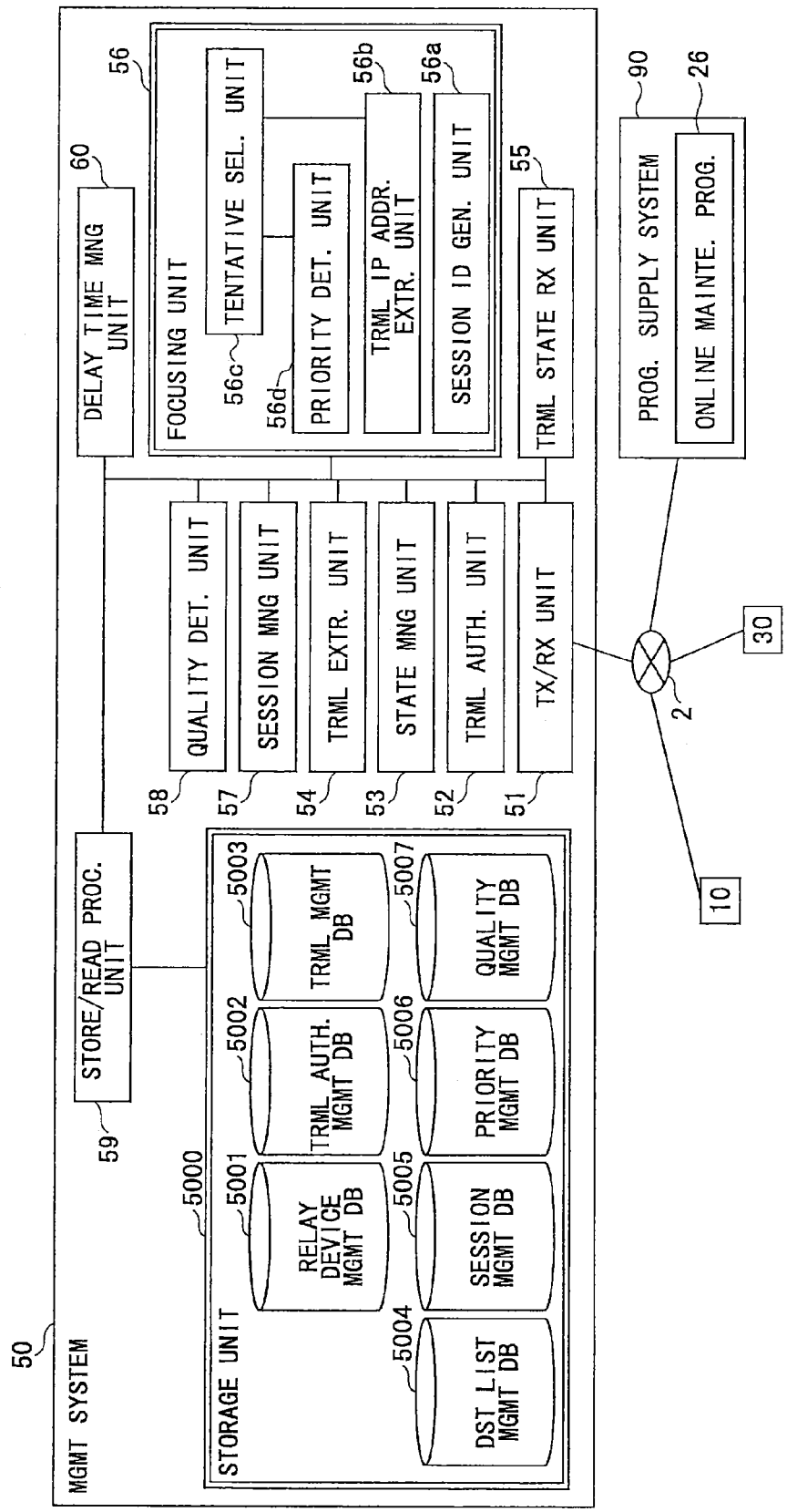
FIGS. 5A and 5B are block diagrams showing a functional configuration of the transmission terminal, the relay device and the management system which constitute the transmission system according to the embodiment.
Figure 5B:
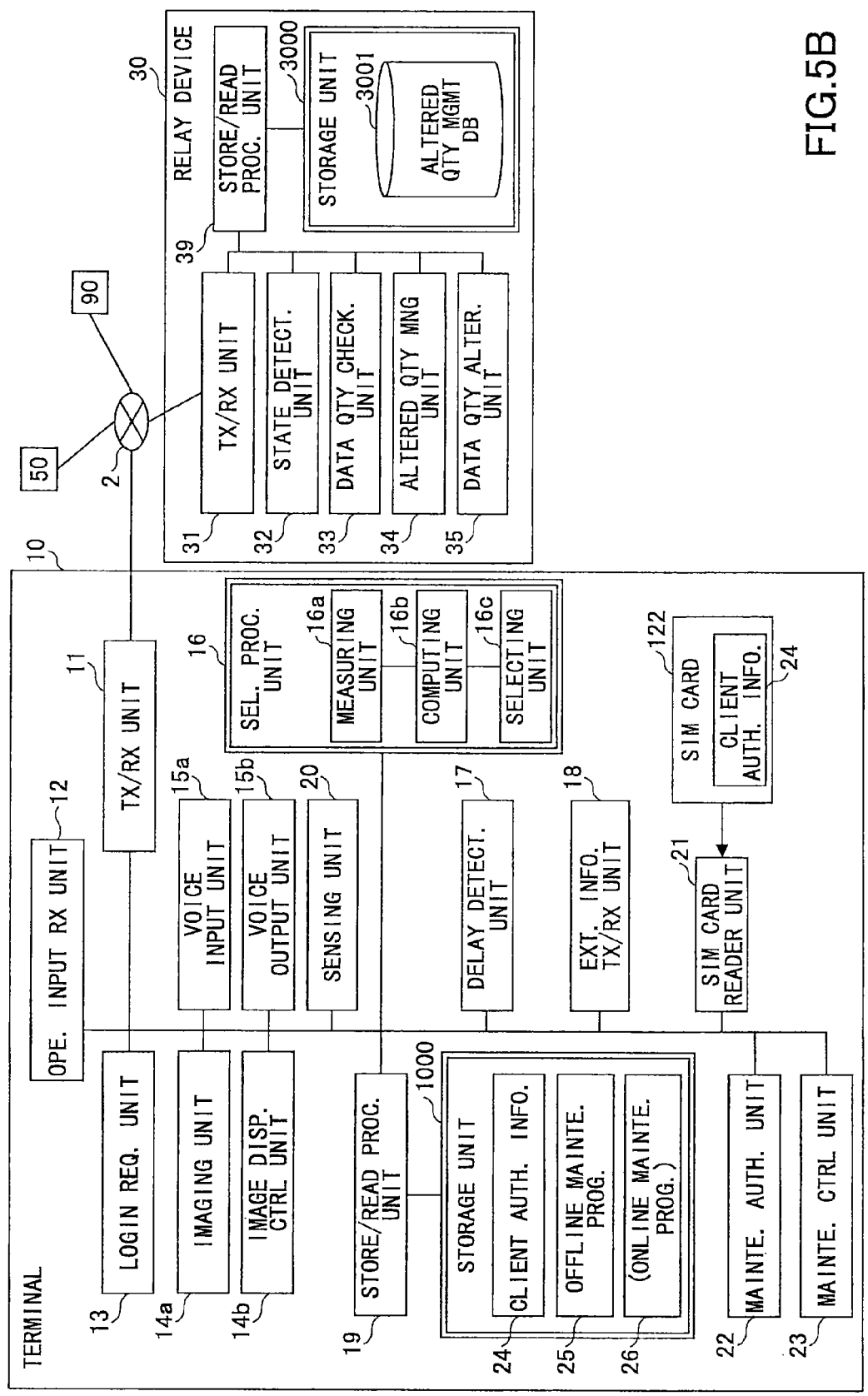

Next, a functional configuration of the transmission system 1 according to the embodiment will be described. FIGS. 5A and 5B are block diagrams showing a functional configuration of the terminal 10, the relay device 30 and the management system 50 which constitute the transmission system 1 according to the embodiment. As shown in FIGS. 5A and 5B, the terminal 10, the relay device 30, and the management system 50 are connected via the communication network 2 so that they carry out data communications with one another via the communication network 2. Note that the external input device 40 shown in FIG. 1 is not directly associated with videoconferencing communications and a description thereof is therefore omitted from FIGS. 5A and 5B.

[Functional Configuration of Terminal]

The terminal 10 includes a transmitter/receiver (TX/RX) unit 11, an operation input receiving unit 12, a login request unit 13, an imaging unit 14a, an image displaying control unit 14b, a voice input unit 15a, a voice output unit 15b, a selection processing unit 16, a delay detecting unit 17, an external information transmitter/receiver (TX/RX) unit 18, a store/read processing unit 19, a SIM (subscriber identity module) card reading unit 21, a maintenance authentication unit 22, and a maintenance control unit 23. These units represent functions or units implemented by any of the elements and devices shown in FIG. 3, which are activated by the instructions from the CPU 201 based on the programs stored in the ROM 202. Further, the terminal 10 includes a storage unit 1000 formed of a solid state drive (SSD) 105 shown in FIG. 3.

Next, the functional units of the terminal 10 will be described in more detail. The transmitter/receiver unit 11 of the terminal 10 is configured to transmit various data (information) to and receive such data from other terminals, devices and systems via the communication network 2. The function of the transmitter/receiver unit 11 is implemented by the network IF 111 shown in FIG. 3. The function of the operation input receiving unit 12 is implemented by the operation button 108 and the power switch 109 shown in FIG. 3, and the operation input receiving unit 12 configured to receive various inputs from a user. For example, when the user switches ON the power switch 109 shown in FIG. 3, the operation input receiving unit 12 shown in FIG. 5B receives a power-ON signal to switch ON the power of the terminal 10.

The login request unit 13 is configured to automatically transmit login request information indicating that the user desires to login, and a current IP address of the terminal 10 as an IP address of a request source terminal from the transmitter/receiver unit 11 to the management system 50 via the communication network 2 when the power-ON signal is received by the operation input receiving unit 12 as a trigger. The function of the login request unit 13 is implemented by instructions from the CPU 101 shown in FIG. 3.

The imaging unit 14a is configured to take an image of a subject and output image data of the subject, and the function of the imaging unit 14 is implemented by instructions received from the CPU 101 shown in FIG. 3 and also by the camera 112 and the image sensor IF 113 shown in FIG. 3.

The image displaying control unit 14b is configured to control transmission of image data to the external display 120, and the function of the image displaying control unit 14b is implemented by the display IF 117 shown in FIG. 3. The image displaying control unit 14b controls the display 120 such that the display 120 displays the image data output at a resolution according to the resolution of the display 120 connected.

The voice input unit 15a is configured to input audio data of the audio signal obtained by the microphone 114 that converts voice of the user into the audio signal and output the audio data according to the audio signal. The function of the voice input unit 15a is implemented by the microphone 114 and the voice input/output IF 116 shown in FIG. 3. The voice output unit 15b is configured to convert the sound signal according to the voice data into voice and output the voice, and the function of the voice output unit 15b is implemented by the speaker 115 and the voice input/output IF 116 shown in FIG. 3.

The selection processing unit 16 includes a measuring unit 16a, a computing unit 16b, and a selecting unit 16c, which are implemented by instructions from the CPU 101 shown in FIG. 3, in order to perform a focusing process to focus on a relay device 30 from among two or more relay devices 30. The measuring unit 16a is configured to measure a date/time of reception of tentative transmission information by the transmitter/receiver unit 11 each time the tentative transmission information is received by the transmitter/receiver unit 11. The computing unit 16b is configured to compute a time from transmission to reception of the tentative transmission information based on a difference between the measured reception date/time and a transmission date/time contained in the tentative transmission information for each of the tentative transmission information the reception date/time of which is measured by the measuring unit 16a. The selecting unit 16c is configured to select a relay device 30 which has relayed the tentative transmission information having the shortest time among the times computed by the computing unit 16b. Accordingly, the selection processing unit 16 finally selects one relay device.

The delay detecting unit 17 is configured to detect a delay time (ms) of the image data or the voice data transmitted from another terminal 10 via the relay device 30, and the function of the delay detecting unit 17 is implemented by instructions from the CPU 101 shown in FIG. 3. The external information transmitter/receiver unit 18 is configured to transmit and receive data to and from an external device via the external device IF 215. The store/read processing unit 19 is configured to store various data in a storage unit 1000 or retrieve the various data stored in the storage unit 1000, and the function of the store/read processing unit 19 is implemented by instructions from the CPU 101 shown in FIG. 3 and also by the SSD 105 shown in FIG. 3.

The storage unit 1000 stores a terminal identification (ID) and a password for identifying the terminal 10, a relay-device ID for identifying a relay device 30 which transmits image data, voice data and various data, and an IP address of a destination terminal. Further, the storage unit 1000 stores an offline maintenance program 25 and client authentication information 24. In addition, the storage unit 1000 may store an online maintenance program 26.

The SIM card reading unit 21 is implemented by a SIM slot 121 shown in FIG. 3. Client authentication information 24 for authenticating the terminal is stored in a SIM card 122 and the client authentication information 24 can be accessed by the SIM card reading unit 21 only.

The maintenance authentication unit 22 is configured to perform a terminal authentication based on whether the client authentication information 24 stored in the SIM card 122 is in agreement with the client authentication information 24 of the storage unit 1000, when the terminal 10 is not connected to the network 2. Disconnection of the terminal 10 from the network may be detected by the transmitter/receiver unit 11 when the network IF 111 does not receive a signal based on voltage or a voltage change. For example, the terminal ID is used for the client authentication information 24. Because the terminal ID is already stored in the storage unit 1000, the client authentication information 24 of the storage unit 1000 may be omitted in such a case. A user ID for identifying the user may also be used for the client authentication information 24, instead of the terminal ID.

Note that in this embodiment, the SIM card 122 is a typical example. Alternatively, a non-volatile memory, such as an IC card, an SD card, or a flash memory, may be used instead. In this case, the SIM card reading unit 21 is replaced by an interface for reading the IC card, the SD card, or the flash memory. Further, in short-distance applications (i.e., in a range of 10 mm to several centimeters), a non-contact IC card or a tag (RFID tag) conforming to the NFC (Near Field Communication) standard specifications may be used instead. Further, an IC card conforming with the TransferJet® standard specifications may be used instead.

When the terminal 10 is connected to the network 2, the maintenance authentication unit 22 transmits the client authentication information 24 stored in the SIM card 122 to the management system 50, and the management system 50 performs the terminal authentication.

The maintenance control unit 23 is configured to read and initiate the offline maintenance program 25 stored in the storage unit 1000 when the terminal 10 is not connected to the network 2 after the maintenance authentication of the terminal is confirmed. On the other hand, when the terminal 10 is connected to the network 2 after the maintenance authentication of the terminal is confirmed, the maintenance control unit 23 is configured to download the online maintenance program 26 from the program supply system 90 (or read the online maintenance program 26 stored in the storage unit 1000) and start the online maintenance program 26. Accordingly, the maintenance range can be altered depending on whether the terminal 10 is in an online state or not.

For example, the online maintenance program 26 may be a program which provides a function of rewriting a firmware or BIOS, a function of obtaining network communication quality information between the terminal and the management system, and a function of providing the ability to support a non-compatible device. The program is not necessary for conducting a videoconference, and an operation of the program cannot be assured for a typical user.

The offline maintenance program 25 is provided with functions which may be performed with an authentication level lower than that of the online maintenance program 26. For example, the offline maintenance program 25 may be provided to acquire log data when the terminal 10 is operated, and to acquire network setting information. Alternatively, the offline maintenance program 25 may be stored in a storage portion in the SIM card.

Note that the terminal ID and the later-described relay-device ID in this embodiment individually indicate identification information formed of language, characters, and various symbols that uniquely identify the terminal 10 and the relay device 30. The terminal ID and the relay-device ID may be the identification information formed of a combination of two or more of the language, characters, and various symbols. In the following, the terminal 10 as a request source terminal that requests initiation of a videoconference communication will be called a "request source terminal 10A", and the terminal 10 as a destination terminal to which the request is sent will be called a "destination terminal 10B".

[Functional Configuration of Relay Device]

Next, the functional units of the relay device 30 will be described. As shown in FIG. 5B, the relay device 30 includes a transmitter/receiver (TX/RX) unit 31, a state detecting unit 32, a data quality checking unit 33, an altered quality managing unit 34, a data quality changing unit 35, and a store/read processing unit 39. These units represent functions and units implemented by any of the elements and devices shown in FIG. 4, which are activated by instructions from the CPU 201 based on the programs stored in the ROM 202. Further, the relay device 30 further includes a storage unit 3000 formed of the HD 204 shown in FIG. 4.

[Altered Quality Management Table]

The storage unit 3000 includes an altered quality management DB (database) 3001 formed of an altered quality management table 3001t shown in FIG. 7. The altered quality management table 3001t includes IP addresses of the relay devices 30 used as relay destination terminals in association with image quality of the image data relayed by the respective devices 30.

Herein, the resolution of the image data treated in this embodiment will be described. FIG. 6A represents a base image used as a low-resolution image formed of 160×120 pixels. FIG. 6B represents a medium-resolution image formed of 320×240 pixels. FIG. 6C represents a high-resolution image formed of 640×480 pixels. When the image data are relayed via a narrow-bandwidth path, the low-resolution image data used as the base image are relayed. When the image data are relayed via a relatively wide bandwidth path, the low-resolution image data used as the base image and the medium-resolution image data exhibiting medium image quality are relayed. When the image data are relayed via an extremely wide bandwidth path, the low-resolution image data used as the base image, the medium-resolution image data exhibiting the medium image quality, and the high-resolution image data exhibiting high image quality are relayed. As in the altered quality management table shown in FIG. 7, if, for example, the relay device 30 relays the image data to the destination terminal 10db having an IP address "1.3.2.4", the quality of the image data relayed is "high image quality".

[Functional Configuration of Management System]

Next, functions and units of the management system 50 will be described. The management system 50 includes a transmitter/receiver (TX/RX) unit 51, a terminal authentication unit 52, a state managing unit 53, a terminal extraction unit 54, a terminal state receiving unit 55, a focusing unit 56, a session managing unit 57, a quality determination unit 58, a store/read processing unit 59, and a delay time managing unit 60. These units represent functions and units implemented by any of the elements and devices shown in FIG. 4, which are activated by instructions from the CPU 201 based on the programs stored in the ROM 202. Further, the management system 50 further includes a storage unit 5000 formed of the HD 204 shown in FIG. 4.

[Relay Device Management Table]

The storage unit 5000 includes a relay device management DB 5001 formed of a relay device management table 5001t shown in FIG. 8. In the relay device management table 5001t, the relay-device IDs of the relay devices 30 are associated with the operating states of the relay devices 30, the receipt date/time at which the state information indicating the operating states of the relay devices 30 are received by the management system 50, the IP addresses of the relay devices 30, and the maximum data transmission speeds (Mbps) of the relay devices 30. For example, in the relay-device management table shown in FIG. 8, the relay-device ID "111a" of the relay device 30a is associated with the operating state "online" of the relay device 30a, the receipt date/time "13:00 Nov. 10, 2009" at which the state information of the relay device 30a is received by the management system 50, the IP address "1.2.1.2" of the relay device 30a, and the maximum data transmission speed 100 Mbps of the relay device 30a.

[Terminal Authentication Management Table]

The storage unit 5000 includes a terminal authentication management DB 5002 formed of a terminal authentication management table 5002t shown in FIG. 9. In the terminal authentication management table 5002t, passwords are individually associated with the terminal IDs of all the transmission terminals 10 managed by the management system 50. For example, in the terminal authentication management table 5002t shown in FIG. 9, the terminal ID "01aa" of the terminal 10aa is associated with the password "aaaa".

The client authentication information 24 is registered in the terminal authentication management DB 5002 for the maintenance. The client authentication information 24 is, for example, a terminal ID, and illustration of the client authentication information 24 is omitted from FIG. 9. The client authentication information 24 may be a user ID, and in such a case, the user ID is registered in the terminal authentication management DB 5002.

[Terminal Management Table]

The storage unit 5000 includes a terminal management DB 5003 formed of a terminal management table 5003t shown in FIG. 10. In the terminal management table 5003t, terminal IDs of the terminals 10 are associated with operating states of the terminals 10, receipt date/time at which the later-described login request information is received by the management system 50, and IP addresses of the terminals 10. For example, in the terminal management table 5003t shown in FIG. 10, the terminal ID "01aa" of the terminal 10aa is associated with the operating state "online" of the terminal 10aa, the receipt date/time "13:40 Nov. 10, 2009" at which the login request information is received by the management system 50, and the IP address "1.2.1.3" of the terminal 10aa.

[Destination List Management Table]

The storage unit 5000 includes a destination list management DB 5004 formed of a destination list management table 5004t shown in FIG. 11. In the destination list management table 5004t, terminal IDs of request source terminals 10A that request initiation of a videoconference communication are individually associated with terminal IDs of destination terminals 10B registered as destination candidate terminals 10B. For example, in the destination list management table 5004t shown in FIG. 11, the terminal ID "01aa" of the request source terminal 10aa is associated with a list of terminal IDs of destination candidate terminals 10B which the request source terminal 10aa requests to initiate the videoconference communication, the destination candidate terminals 10B including the terminal 10ab having a terminal ID "01ab", the 10ba having a terminal ID "01ba", and the terminal 10db having a terminal ID "01db". The destination candidate terminals 10B may be added or deleted based on instructions from the request source terminal 10A to the management system 50.

[Session Management Table]

The storage unit 500 includes a session management DB 5005 formed of a session management table 5005t shown in FIG. 12. In the session management table 5005t, session IDs that identify sessions in which the communication data are transmitted and received between the terminals are associated with the relay device IDs of the relay devices 30 utilized for relaying the image data and the audio data, the terminal ID of the request source terminal 10A, the terminal IDs of the destination terminals 10B, delay time (ms) in receiving the image data by the destination terminals 10B, and receipt date/time at which the delay information indicating the delay time transmitted from each of the destination terminals 10B is received by the management system 50. For example, in the session management table 5005t illustrated in FIG. 12, the relay device 30a (having the relay device ID "111a") selected for executing the session having the session ID "se1" is associated with the request source terminal 10aa having the terminal ID "01aa" that has a videoconference with the destination terminal 10bb having the terminal ID "01bb", the destination terminal 10cb having the terminal ID "01cb", and the destination terminal 10db having the terminal ID "01db". The session management table indicates that the relay device 30a relays the image data and the audio data between the request source terminal 10aa and the destination terminals 10bb, 10cb, and 10db, and delay time 200 ms in receiving the image data by the destination terminal 10db at the receipt date/time "14:00 Nov. 10, 2009". Note that if the videoconference is conducted between the two terminals 10, the receipt date/time of the delay information may be managed not based on the destination terminals but based on the delay information transmitted from the request source terminal. However, if the videoconference is conducted between three or more terminals 10, the receipt date/time of the delay information may be managed based on the delay information transmitted from the terminals 10 on the reception side of the image data and the audio data.

[Address Priority Management Table]

The storage unit 5000 includes a priority management DB 5006 formed of an address priority management table 5006t1 shown in FIG. 13. In the address priority management table 5006t1, the level of address priority is increased or decreased according to the difference pattern of four dot address portions of an IP address under the typical IPv4 and the difference patterns of the four dot address portions of the IP address are associated with the address priority levels. For example, in the address priority management table 5006t1 shown in FIG. 13, when the difference pattern indicates that the values of the highest-order, the second highest-order and the second lowest-order dot address portions of the IP address are the same ("Y.Y.Y.N"), the address priority level is "5". When the difference pattern indicates that the values of the highest-order and the second highest-order dot address portions of the IP address are the same ("Y.Y.N.-"), the address priority level is "3". In this case, the value of the lowest-order dot address portion of the IP address is disregarded. When the difference pattern indicates that the value of the highest-order dot address portion of the IP address is the same and the value of the second highest-order dot address portion of the IP address differs ("Y.N.-.-"), the address priority level is "1". In this case, the value of the second lowest-order dot address portion of the IP address is disregarded. When the difference pattern indicates that the value of the highest-order dot address portion of the IP address differs, the address priority level is "0". In this case, the values of the second highest-order, the second lowest-order and the lowest-order dot address portions are disregarded.

[Transmission Speed Priority Management Table]

The priority management DB 5006 of the storage unit 5000 further includes a transmission speed priority management table 5006t2 shown in FIG. 14. In the transmission speed priority management table 5066t2, the level of transmission speed priority is increased or decreased according to the value of the maximum data transmission speed (Mbps) of the relay device 30 and the maximum data transmission speed values of the relay devices 30 are associated with the transmission speed priority levels. For example, in the transmission speed priority management table 5066t2 shown in FIG. 14, when the maximum data transmission speed value of the relay device 30 is over 1000 Mbps, the transmission speed priority level is "5". When the maximum data transmission speed value of the relay device 30 is less than 1000 Mbps and greater than 100 Mbps, the transmission speed priority level is "3". When the maximum data transmission speed value of the relay device 30 is less than 100 Mbps and greater than 10 Mbps, the transmission speed priority level is "1". When the maximum data transmission speed value of the relay device 30 is under 10 Mbps, the transmission speed priority level is "0".

[Quality Management Table]

The storage unit 5000 further includes a quality management DB 5007 formed of a quality management table 5007t shown in FIG. 15. In the quality management table 5007t, the delay time (ms) of the image data in the request source terminal 10A or the destination terminal 10B is associated with the image quality (quality of image) of the image data relayed by the relay device 30.

[Functional Units of Management System]

Next, functional units of the management system 50 will be described. Note that in the following, the functions of the management system 50 are described in association with the main element and devices for implementing the units of the management system 50 shown in FIG. 4.

The transmitter/receiver unit 51 of the management system 50 is configured to transmit various data (information) to and receive the data from other terminals, relay devices and systems via the communication network 2. The function of the transmitter/receiver unit 51 is implemented by the network IF 209 shown in FIG. 4. The terminal authentication unit 52 is configured to search the terminal authentication management DB 5002 of the storage unit 5000 by the terminal ID and the password contained in the login request information received via the transmitter/receiver unit 51 as search keys, and authenticate the corresponding terminal based on whether the terminal ID and the password contained in the login request information are identical to those managed in the terminal authentication management DB 5002. Further, the terminal authentication unit 52 of this embodiment is configured to authenticate a service person (the object of authentication in this case may be replaced by the SIM card or the terminal 10) based on whether the client authentication information 24 received from the terminal 10 is registered in the terminal authentication management DB 5002.

In order to manage the operating state of the request source terminal 10A which has sent the login request information, the state managing unit 53 is configured to manage the terminal management table 5003*t* (see FIG. 10) by associating the terminal ID of the request source terminal 10A with the operating state of the request source terminal 10A, the receipt date/time at which the login request information is received by the management system 50, and the IP address of the request source terminal 10A.

The terminal extraction unit 54 is configured to search the destination list management table 5004*t* (FIG. 11) by the terminal ID of the request source terminal 10A which has sent the login request as a search key, and retrieve the terminal IDs of the destination candidate terminals 10B capable of communicating with the request source terminal 10A. As a result, the terminal extraction unit 54 extracts the terminal IDs of the destination candidate terminals 10B. Further, the terminal extraction unit 54 is configured to search the destination list management table 5004*t* (FIG. 11) by the terminal ID of the request source terminal 10A which has sent the login request as a search key, and extract terminal IDs of other request source terminals 10A which have registered the above terminal ID of the request source terminal 10A as a destination candidate terminal 10B.

The terminal state receiving unit 55 is configured to search the terminal management table 5003*t* (FIG. 10) by the terminal IDs of the destination candidate terminals 10B extracted by the terminal extraction unit 54 as search keys, and retrieve the operating states of the extracted destination candidate terminals 10B by the terminal IDs of the extracted destination candidate terminals 10B. Thus, the terminal state receiving unit 55 receives the operating states of the destination candidate terminals 10B capable of communicating with the request source terminal 10A which has sent the login request. Further, the terminal state receiving unit 55 is configured to search the terminal management table (FIG. 10) by the terminal IDs of the terminals extracted by the terminal extraction unit 54 as search keys, and receive the operating state of the request source terminal 10A which has sent the login request.

In order to support a final focusing process to finally select a relay device 30 from plural relay devices 30, the focusing unit 56 is configured to perform a tentative focusing process before the final focusing process. Thus, the focusing unit 56 may implement a session ID generation unit 56*a*, a terminal IP address extraction unit 56*b*, a tentative selection unit 56*c* and *a* priority determining unit 56*d* based on instructions from the CPU 201 shown in FIG. 4.

The session ID generation unit 56*a* is configured to generate session IDs used for execution of sessions for selecting the relay devices 30. The terminal IP address extraction unit 56*b* is configured to search the terminal management table 5003*t* (FIG. 10) based on the terminal ID of the request source terminal 10A and the terminal ID of the destination terminal 10B contained in the initiation request information received from the request source terminal 10A, and extract the corresponding IP addresses of the terminals 10A and 10B.

The tentative selection unit 56*c* is configured to tentatively select the relay devices 30 by selecting the relay-device IDs of the relay devices 30 having the operating states "online" from the relay devices 30 contained in the relay device management table 5001*t* (FIG. 8).

Further, the tentative selection unit 56*c* is configured to search the relay-device management table 5001*t* (FIG. 8) based on the IP address of the request source terminal 10A and the IP address of the destination terminal 10B, which are extracted by the terminal IP address extraction unit 56*b*, and determine difference patterns of the dot address portions between the IP addresses of the selected relay devices 30 and the IP address of each of the request source terminal 10A and the destination terminal 10B. In this embodiment, a unified priority level that combines the address priority level and the transmission speed priority level is also checked. Thus, the tentative selection unit 56*c* is configured to select two relay devices 30 having higher unified priority levels from among the tentatively selected relay devices 30.

In this embodiment, the two relay devices 30 having the higher unified priority levels are selected. However, the tentative selection unit 56*c* is not restricted to this embodiment. The tentative selection unit 56*c* may be configured to select three or more relay devices 30 with the higher levels of the integrated priority.

The priority determining unit 56*d* is configured to determine the address priority level by retrieving the address priority management table 5006*t*1 (FIG. 13) for each of the relay devices 30 selected by the tentative selection unit 56*c*. Further, the priority determining unit 56*d* is configured to determine the transmission speed priority level for each of the relay devices 30 selected by the tentative selection unit 56*c*, by retrieving the transmission speed priority management table 5006*t*2 (FIG. 14) based on the maximum data transmission speed of each of the relay devices 30 contained in the relay-device management table 5001*t* (FIG. 8).

The session managing unit 57 is configured to store and manage the session management table 5005*t* (FIG. 12) of the storage unit 5000 by associating the session IDs generated by the session ID generation unit 56*a* with the terminal ID of the request source terminal and the terminal ID of the destination terminal. Further, the session managing unit 57 is configured to store and manage the relay-device ID of the relay device 30 finally selected by the selecting unit 16*c* of the terminal 10 in the session management table 5005*t* (FIG. 12) in association with a corresponding one of the session IDs.

The quality determination unit 58 is configured to search the quality management table 5007*t* (FIG. 15) by the delay time as a search key, extract the image quality of the corresponding image data, and determine the image quality of the image data relayed by the relay device 30.

The store/read processing unit 59 is configured to store various data in the storage unit 5000 and retrieve various data from the storage unit 5000. The function of the store/read processing unit 59 is implemented by the HDD 205 shown in FIG. 4. The delay time managing unit 60 is configured to search the terminal management table 5003*t* (FIG. 10) by the IP address of the destination terminal 10B as a search key, and extract the corresponding terminal ID. Further, the delay time managing unit 60 is configured to store the delay time indicated by the delay information in a delay time field of the record corresponding to the extracted terminal ID in the session management table 5005*t* (FIG. 12).

[Process/Operation of Embodiment]

Figure 16:
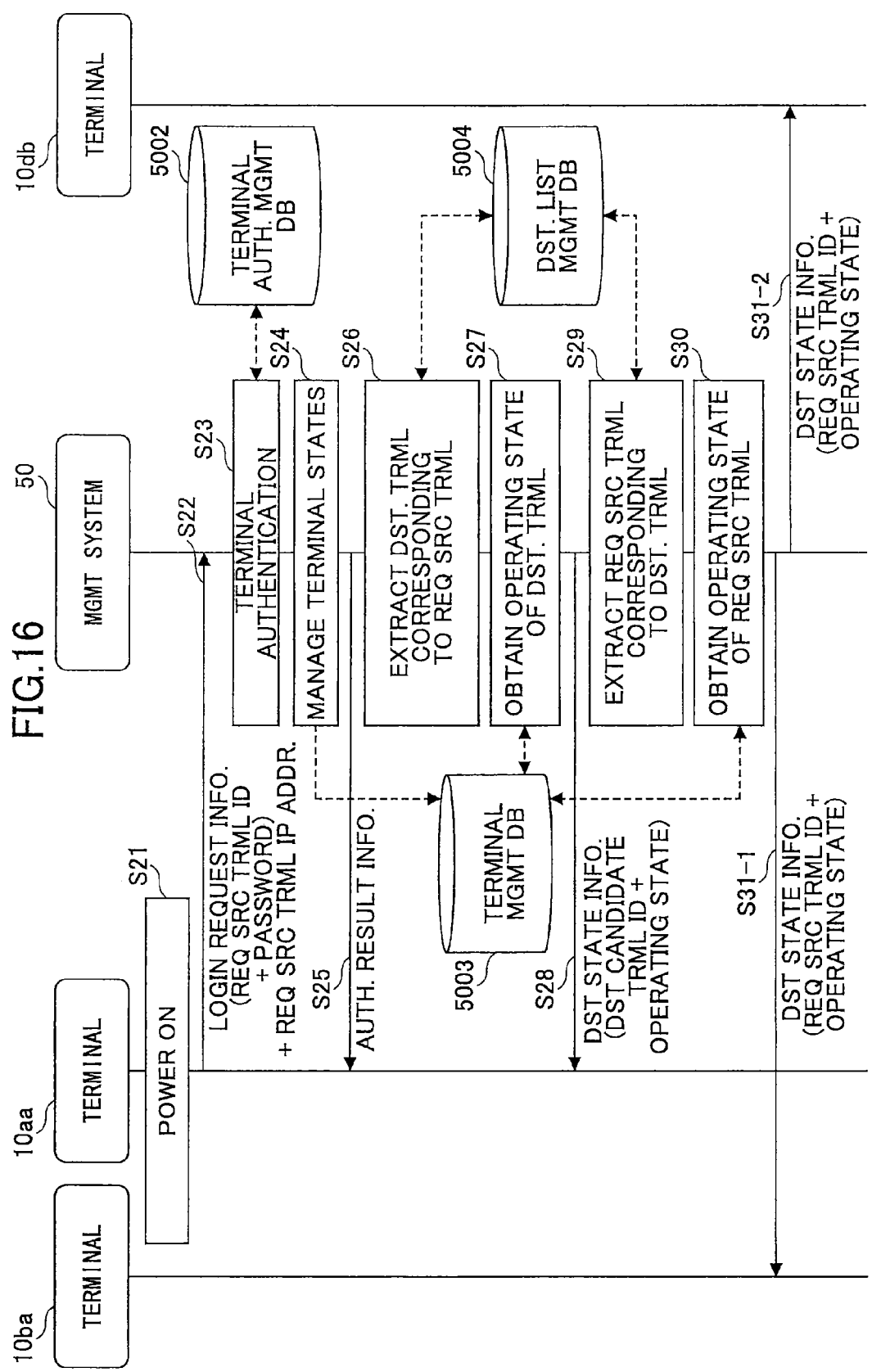
FIG. 16 is a sequence diagram for explaining a preparatory process to start communication between transmission terminals.

FIG. 16 is a sequence diagram for explaining a preparatory process to start communication between the terminals 10. First, when a user of the terminal 10*aa* switches ON the power switch 109 shown in FIG. 3, the operation input receiving unit 12 shown in FIG. 5B receives a power-ON signal to switch ON the power of the terminal 10*aa* (step S21). Upon reception of the power-ON signal as a trigger, the login request unit 13 automatically transmits the login request information indicating the login request from the transmitter/receiver unit 11 to the management system 50 via the communication network 2 (step S22). The login request information includes a terminal ID and a password for identifying the terminal 10*aa* which is described as the request source terminal. The terminal ID and the password are data that are read from the storage unit 1000 via the store/read processing unit 19 and then transmitted to the transmitter/receiver unit 11. Note that when the login request information is transmitted from the terminal 10*aa* to the management system 50, the receiver side management system 50 may detect the IP address of the transmitter side terminal 10*aa*.

Next, the terminal authentication unit 52 of the management system 50 authenticates the terminal 10*aa* based on whether the terminal ID and the password contained in the login request information received via the transmitter/receiver unit 51 are identical to those managed in the terminal authentication management DB 5002, by searching for the terminal ID and the password as search keys in the terminal authentication management table 5002*t* (FIG. 9) of the storage unit 5000 (step S23).

The terminal authentication unit 52 manages identical terminal IDs and identical passwords. Thus, when the terminal authentication unit 52 determines that the received login request comes from the terminal 10 having a valid access authorization, the state managing unit 53 stores, in the terminal management table 5003*t* (FIG. 10), the terminal ID of the terminal 10*aa* in association with the operating state of the terminal 10*aa*, the receipt date/time of the login request information and the IP address of the terminal 10*aa* (step S24). Thus, the operating state "online", the receipt date/time "2009.11.10.13:40" and the terminal IP address "1.2.1.3" are managed in the terminal management table 5003*t* (FIG. 10) in association with the terminal ID "01aa".

Subsequently, the transmitter/receiver unit 51 of the management system 50 transmits authentication result information indicating authentication result obtained by the terminal authentication unit 52 via the communication network 2 to the request source terminal 10*aa* that has sent the login request (step S25). In the following, the case where the terminal authentication unit 52 has determined that the terminal (e.g., in this case, the terminal 10*aa*) has the valid access authorization will be described.

The terminal extraction unit 54 of the management system 50 searches the destination list management table 5004*t* (FIG. 11) by the terminal ID "01aa" of the request source terminal 10*aa* that has sent the login request as a search key, and retrieves the terminal IDs of the destination candidate terminals 10B capable of communicating with the request source terminal (i.e., the terminal 10*aa*). As a result, the terminal extraction unit 54 extracts the terminal IDs of the destination candidate terminals 10B capable of communicating with the request source terminal (step S26). In this example, terminal IDs "01ab", "01ba" and "01db" of the destination terminals (10*ab*, 10*ba*, 10*db*) associated with the terminal ID "01aa" of the request source terminal 10*aa* are extracted.

Subsequently, the terminal state receiving unit 55 searches the terminal management table 5003*t* (FIG. 10) by the terminal IDs ("01ab", "01ba", "01db") of the destination candidate terminals 10B extracted by the terminal extraction unit 54 as search keys, and retrieves the operating states ("offline", "online", "online") of the destination candidate terminals 10B (10*ab*, 10*ba*, 10*db*) extracted by the terminal extraction unit 54 based on the respective terminal IDs (step S27).

Subsequently, the transmitter/receiver unit 51 transmits the destination state information containing the terminal IDs ("01ab", "01ba", "01db") used as the search keys in step S27, and the operating states ("offline", "online", "online") of the corresponding destination candidate terminals (10*ab*, 10*ba*, 10*db*) to the request source terminal 10*aa* via the communication network 2 (step S28). Thus, the request source terminal 10*aa* at this time may detect the operating states ("offline", "online", "online") of the terminals (10*ab*, 10*ba*, 10*db*) which are the destination candidate terminals 10B capable of communicating with the request source terminal 10*aa*.

Further, the terminal extraction unit 54 of the management system 50 searches the destination list management table 5004*t* (FIG. 11) by the terminal ID "01aa" of the request source terminal 10*aa* that has sent the login request as a search key, and extracts terminal IDs of other request source terminals 10A that have been registered as destination candidate terminals 10B for the terminal ID "01aa" of the request source terminal 10*aa*. As a result, the terminal extraction unit 54 extracts the terminal IDs of other request source terminals 10A that have been registered as destination candidate terminals 10B for the terminal ID "01aa" of the request source terminal 10*aa* (step S29). In the destination list management table 5004*t* shown in FIG. 11, the extracted terminal IDs of the other request source terminals 10A that have been registered as the destination candidate terminals 10B for the terminal ID "01aa" of the request source terminal 10*aa* are "01ab", "01ba" and "01db".

Subsequently, the terminal state receiving unit 55 of the management system 50 searches the terminal management table 5003*t* (FIG. 10) by the terminal ID "01aa" of the request source terminal 10*aa* that has sent the login request as a search key, and receives the operating state of the request source terminal 10*aa* which has sent the login request (step S30).

Subsequently, the transmitter/receiver unit 51 transmits the destination state information containing the terminal ID "01aa" and the operating state "online" of the request source terminal 10*aa* obtained in step S30 to the terminals (10*ba*, 10*db*) the operating states of which are presented as "online" in the terminal management table 5003*t* (FIG. 10) among the terminals (10*ab*, 10*ba*, 10*db*) corresponding to the terminal IDs ("01ab", "01ba", "01db") extracted in step S29 (steps S31-1 and S31-2). Note that when the transmitter/receiver unit 51 transmits the destination state information to the terminals (10*ba*, 10*db*), the transmitter/receiver unit 51 refers to the IP addresses of the terminals managed in the terminal management table 5003*t* (FIG. 10) based on the respective terminal IDs ("01ba", "01db"). Accordingly, the terminal ID "01aa" and the operating state "online" of the request source terminal 10*aa* may be transmitted to each of the other destination candidate terminals (10*db*, 10*ba*) capable of communicating with the request source terminal 10*aa* that has sent the login request as the destination terminal.

In a similar manner as step S21, when the user on another terminal 10 switches ON the power switch 109 shown in FIG. 4, the operation input receiving unit 12 shown in FIG. 5B receives a power-ON signal and subsequently the other terminal 10 will perform a process similar to the above-described process of steps S22 through S31-1, 31-2. Thus, a description of the process of steps S22 through S31-1, 31-2 is omitted.

Figure 17:
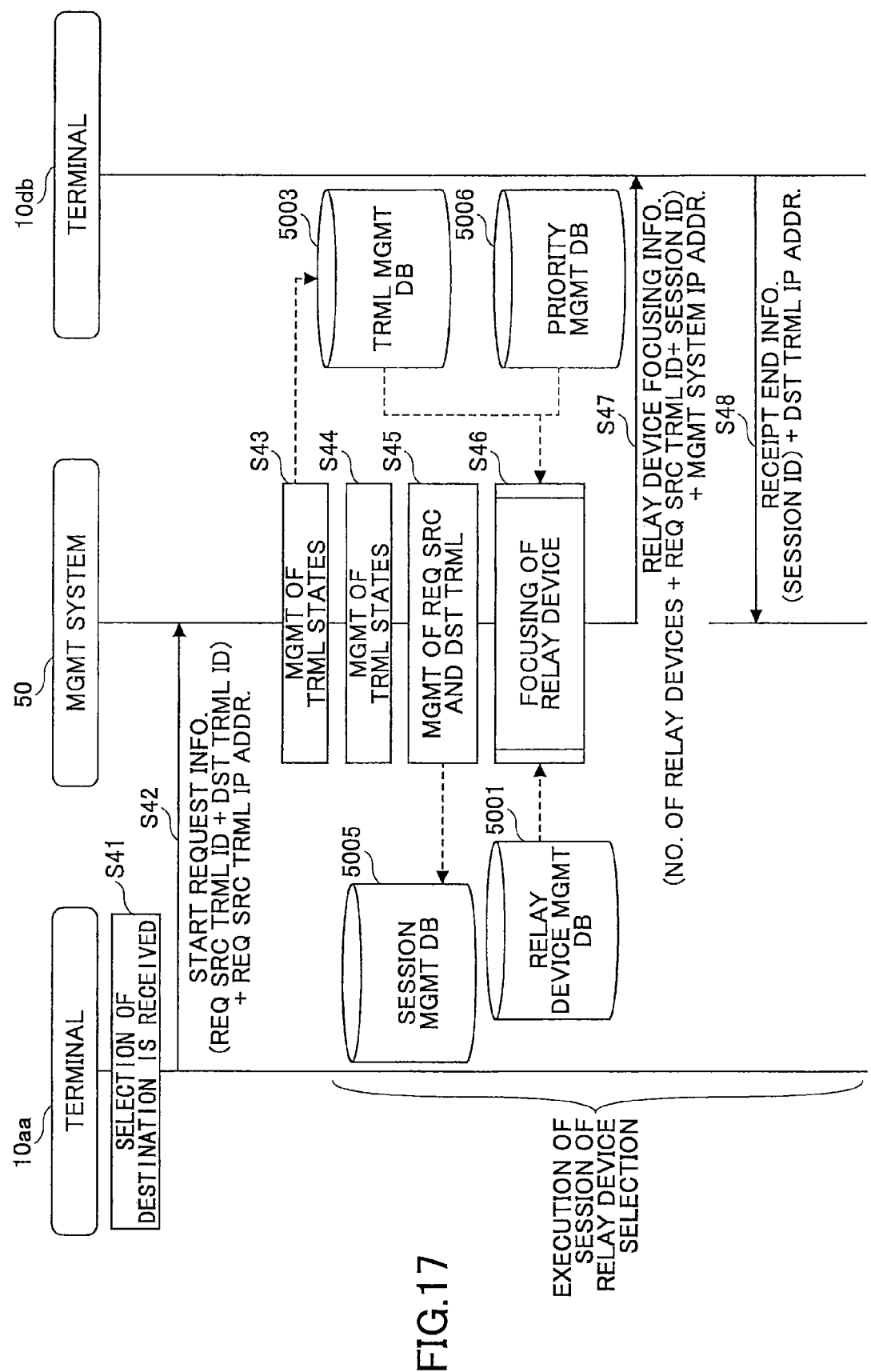
FIG. 17 is a sequence diagram for explaining a process to perform focusing of relay devices.

Next, a process to perform focusing of the relay devices 30 will be described with reference to FIG. 17. FIG. 17 is a sequence diagram showing the process to perform focusing of the relay devices 30. In this embodiment, the request source terminal 10*aa* may communicate with at least one of the terminals (10*ba*, 10*db*) the operating states of which are presented as "online" by the destination state information received in step S28 among the terminals 10 as the destination candidate terminals. In the following, the case where the user of the request source terminal 10*aa* selects to start communication with the destination terminal 10*db* will be described.

First, when a user of the terminal 10*aa* presses the operation button 108 shown in FIG. 3 to select the terminal 10*db*, the operation input receiving unit 12 shown in FIG. 5B receives a request to start communication with the terminal 10db as the destination terminal (step S41). The transmitter/receiver unit 11 of the terminal 10aa transmits the start request information containing the terminal ID "01aa" of the request source terminal 10aa and the terminal ID "01db" of the destination terminal 10db and indicating the request to start communication with the management system 50 to the management system 50 (step S42). Accordingly, the transmitter/receiver unit 51 of the management system 50 receives the start request information and may detect the IP address "1.2.1.3" of the request source terminal 10aa. Based on the terminal ID "01aa" of the request source terminal 10aa and the terminal ID "01db" of the destination terminal 10db contained in the start request information, the state managing unit 53 changes the operating state fields of the records corresponding to the terminal ID "01aa" and the terminal ID "01db" in the terminal management table 5003t of the terminal management DB 5003 to "busy", respectively (step S43). In this state, the request source terminal 10aa and the destination terminal 10db have not yet started the communication but the operating states of these terminals are set to a busy state, and if other terminals 10 attempt to communicate with the request source terminal 10aa or the destination terminal 10db, a display or voice message indicating the terminal busy state will be output.

Next, the procedure of steps S44 through S48 and steps S61-1 through S66 to perform a session for selecting the relay device 30 will be described. First, the session ID generation unit 56a manages the terminal states by generating a selection session ID used for execution of the session for selecting the relay device 30 (step S44). The session managing unit 57 stores and manages, in the session management table 5005t (FIG. 12) of the storage unit 5000, the selection session ID "se1" generated in step S44 in association with the terminal ID "01aa" of the request former terminal 10aa and the terminal ID "01db" of the destination terminal 10db (step S45).

Subsequently, the focusing unit 56 of the management system 50 performs tentative focusing of the relay device 30 for relaying the communication between the request source terminal 10aa and the destination terminal 10db based on the relay-device management DB 5001, the terminal management DB 5003 and the priority management DB 5006 (step S46).

Figure 18:
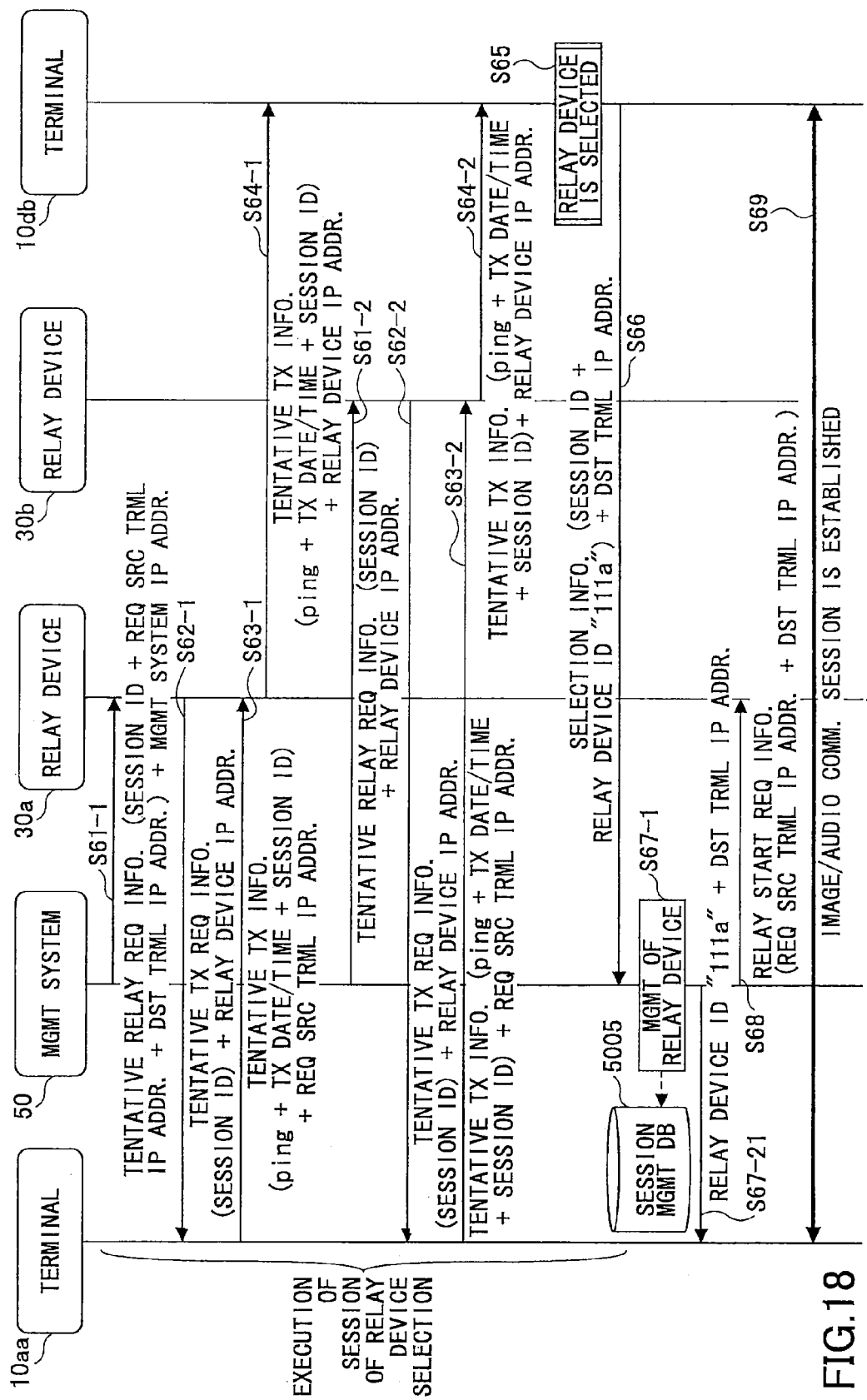
FIG. 18 is a sequence diagram for explaining a process to select a relay device by the transmission terminal.

Next, a process to select the relay device 30 by the terminal 10aa will be described with reference to FIG. 18. First, before starting a videoconference, the management system 50 transmits tentative relay request information indicating that the relaying of the communication is tentatively requested, to each of the relay devices (30a, 30b) selected in step S46 (step S61-1, S61-2). The tentative relay request information contains the session ID "se1", the IP address "01aa" of the request source terminal 10aa and the IP address "01db" of the destination terminal 10db. Thus, the relay devices (30a, 30b) may detect the selection session, the IP addresses of the request source terminal 10A and the destination terminal 10B, and the IP address "1.1.1.2" of the management system 50 that has sent the tentative relay request information.

Subsequently, the transmitter/receiver units 31 of the relay devices (30a, 30b) transmit, to the request source terminal 10aa detected in steps S61-1 and S61-2 via the communication network 2, tentative transmission request information indicating that tentative transmission information containing the later-described "ping" (Packet Internet Grouper; or Internet Control Message Protocol packet) is transmitted to each of the relay devices (30a, 30b) before starting the videoconference (steps S62-1, S62-2). The tentative transmission request information contains the session ID "se1". Thus, the request source terminal 10aa may detect that the tentative transmission information is transmitted to each relay device (30a, 30b) in the selection process of the relay device 30 performed with the session ID "se1", and may detect the IP addresses ("1.2.1.2", "1.2.2.2") of the relay devices (30a, 30b) which are the source devices that have sent the tentative transmission request information.

In this embodiment, the request source terminal 10aa does not receive the IP address of the destination terminal 10db directly from the management system 50, and the IP address of the destination terminal 10db is notified to the relay device 30a in step S61-1. Further, the relay device 30a transmits the tentative transmission request information to the request source terminal 10aa in step 61-2. The purpose of these steps is to ensure security of information by preventing each terminal 10 from receiving the IP addresses of other terminals 10 directly from the management system 50.

Next, the transmitter/receiver unit 11 of the request source terminal 10aa transmits the tentative transmission information to the relay devices (30a, 30b) via the communication network 2 (steps S63-1, S63-2). The tentative transmission information is transmitted to the destination terminal 10db via the relay devices (30a, 30b) in advance of transmission of image data and voice data. The tentative transmission information is used to measure a time from the transmission by the request source terminal 10aa to the reception by the destination terminal db. The tentative transmission information contains the "ping" to check the connection between the request source terminal 10aa, the relay devices (30a, 30b) and the destination terminal 10db such that they can communicate with one another, the transmission date/time of the tentative transmission information transmitted by the request source terminal 10aa, and the session ID "set". Thus, the relay devices (30a, 30b) may detect that the tentative transmission information has been sent during the session with the session ID "se1", and may detect the IP address "1.2.1.3" of the request source terminal 10aa that has sent the tentative transmission information.

Next, the relay devices (30a, 30b) relay the received tentative transmission information to the IP address "1.3.2.4" of the destination terminal 10db contained in the tentative relay request information received in steps S61-1 and S61-2 (steps S64-1, S64-2). Thus, the destination terminal 10db may detect that the tentative transmission information has been sent during the session with the session ID "se1", and may detect the IP addresses ("1.2.1.2", "1.2.2.2") of the relay devices (30a, 30b) that have sent the tentative transmission information.

Subsequently, the selection processing unit 16 of the destination terminal 10db finally selects a relay device 30 that relays the image data and the voice data during the videoconference based on the tentative transmission information (step 65).

Subsequently, the transmitter/receiver unit 11 of the destination terminal 10db transmits selection information indicating that the relay device 30a is selected to the management system 50 via the communication network 2 (step S66). The selection information contains the session ID "se1" and the relay-device ID "111a" of the selected relay device 30a. Thus, the management system 50 may detect that during the session with the session ID "se1", the relay device 30a is selected, and may detect the IP address "1.3.2.4" of the terminal 10db which has sent the selection information.

Subsequently, the session managing unit 57 of the management system 50 stores and manages the relay device ID "111a" of the finally selected relay device 30a into the relay-device ID field of the record corresponding to the session ID "se1" contained in the session management table 5005*t* (FIG. 12) of the session management DB 5005 (step S67-1). The transmitter/receiver unit 51 transmits the IP address "1.3.2.4" of the destination terminal 10*db* and the relay-device ID "111*a*" to the request source terminal 10*aa* (step S67-21). The transmitter/receiver unit 51 of the management system 50 transmits relay start request information indicating the request to start the relaying to the relay device 30*a* via the communication network 2 (step S68). The relay start request information contains the IP addresses ("1.2.1.3", "1.3.2.4") of the request source terminal 10*aa* and the destination terminal 10*db*. Thus, the relay device 30*a* establishes the session for communication of image data with the three resolutions (low, medium and high resolutions) and voice data between the terminals (10*aa*, 10*db*) (step S69). Thus, the terminals (10*aa*, 10*db*) may start the videoconference.

Each terminal 10 is capable of transmitting and receiving image data by using image coding standard specifications, such as H.264 (H.264/AVC, MPEG4 part10, MPEG4 AVC), H.264/SVC or MPEG2.

In the foregoing embodiment, after the management system 50 transmits the relay device focusing information to the destination terminal 10*db* in step S47 of FIG. 17 and the procedure of steps S48 through S64-1, S64-2 is performed, the relay device selection process (step S65) is performed by the destination terminal 10*db*. Alternatively, the management system 50 may transmit the relay device focusing information to the request source terminal 10*aa* in step S47 of FIG. 17 and the destination terminal 10*db* in the procedure of steps S48 through S64-1, S64-2 may be replaced by the request source terminal 10*aa*. Thus, in such an alternative embodiment, the request source terminal 10*aa* may perform the relay device selection process in step S65 and may transmit the selection information to the management system 50 in step S66.

[Online/Offline Authentication]

Figure 19:
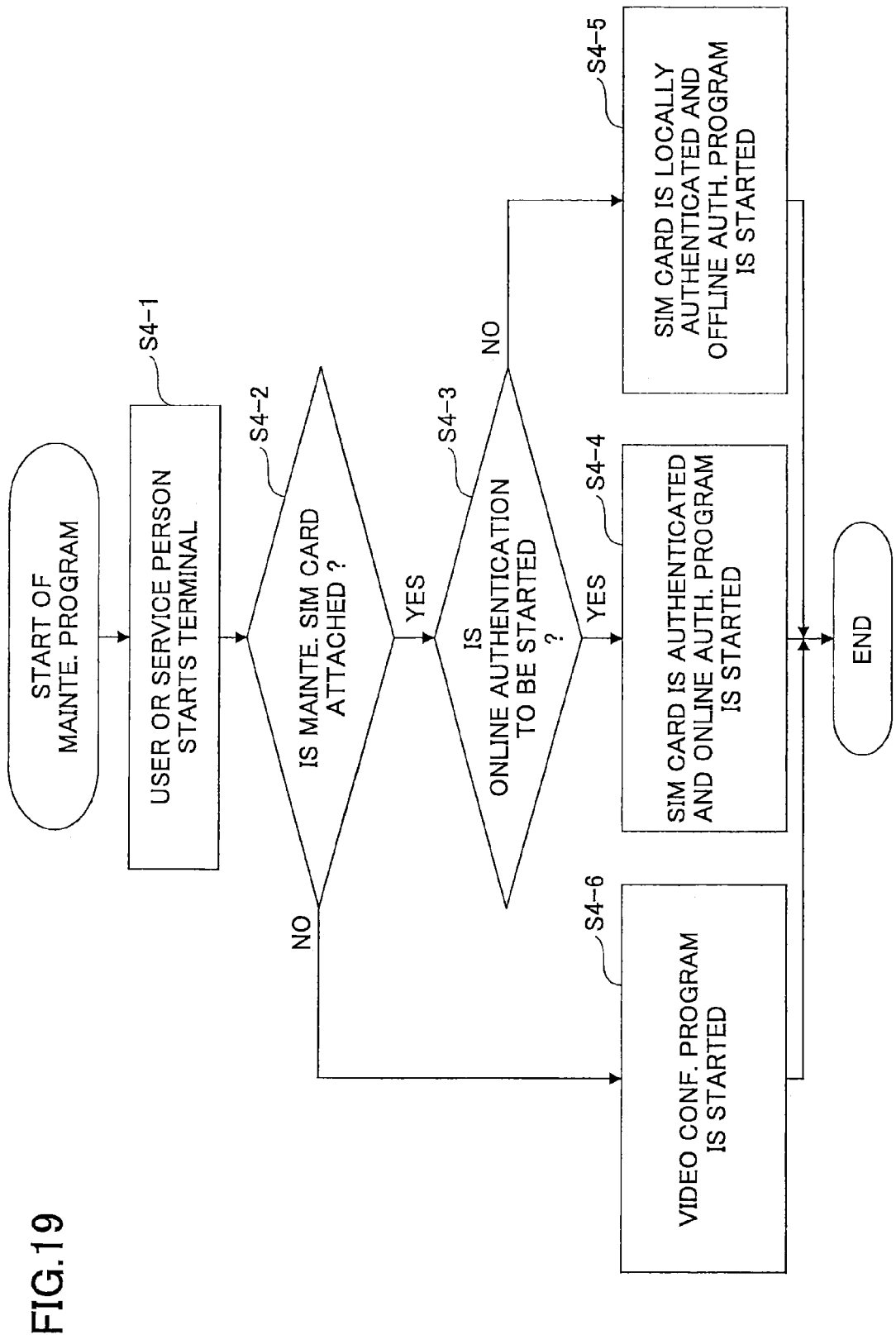
FIG. 19 is a flowchart for explaining a process of initiation of a maintenance program.

FIG. 19 is a flowchart for explaining a maintenance program initiation process. First, a user or a service person starts the terminal 10 (S4-1). The terminal 10 is started when the user or the service person switches ON the power switch of the terminal 10 as in step S21 of FIG. 16. Before the power switch is turned ON, the service person inserts a maintenance SIM card 122 into the SIM slot 121 of the terminal 10 and then switches ON the power of the terminal 10. The maintenance SIM card 122 is managed by a maintenance control company to which the service person belongs and can be carried by only the service person who has a valid authorization from the maintenance control company. The SIM card 122 may be a non-contact IC card conforming to the NFC standard specifications.

For example, the SIM card 122 is stored in a locked locker which can be unlocked only when an identification IC card of the service person is detected as having a valid authorization by a card reader. Alternatively, biometric identity verification may be utilized. Thus, the service person carrying the SIM card 122 and the start time of card use may be identified. Similarly, at the time of return of the SIM card 122, the card return time may be recorded when the IC card of the service person is read by the card reader. Namely, the SIM card 122 is stringently managed when it is used by the service person and also before it is used by the service person.

In the event that the service person has lost the maintenance SIM card, the maintenance control company may delete the corresponding client authentication information of the SIM card from the terminal authentication management DB 5002 in the management system 50. In this way, such a SIM card may be set in an invalid condition and it is possible to prevent a third party having the SIM card from receiving online authentication to perform a maintenance operation on the terminal 10.

The maintenance authentication unit 22 of the started terminal 10 detects whether the maintenance SIM card 122 is attached to the SIM card reading unit 21 (S4-2). Specific information, such as the identification information of the maintenance control company, is registered in the maintenance SIM card 122.

When a general-use SIM card is attached or the maintenance SIM card 122 is not attached to the SIM card reading unit 21 (No of S4-2), the terminal 10 is started in a general-user mode (in which a videoconference program may be started) (S4-6).

When the maintenance SIM card 122 is attached to the SIM card reading unit 21 (Yes of S4-2), the maintenance authentication unit 22 determines whether online authentication is to be started (S4-3).

In the case of the online authentication (Yes of S4-3), terminal authentication for maintenance is performed by the terminal authentication unit 52 of the management system 50 (S4-4). That is, the maintenance authentication unit 22 reads the client authentication information 24 from the SIM card 122, and transmits the client authentication information 24 to the management system 50 via the transmitter/receiver unit 11. The terminal authentication unit 52 of the management system 50 determines whether authentication of the service person (or authentication of the SIM card 122) is confirmed based on whether client authentication information 24 that matches with the received client authentication information 24 is registered in the terminal authentication management DB 5002.

When the authentication of the service person is confirmed, the online maintenance program 26 from the program supply system 90 is transmitted to the terminal 10, and the maintenance control unit 23 starts the online maintenance program 26 (S4-4). Thus, the service person is able to perform a maintenance operation which is difficult to perform by a general user. When the authentication of the service person is not confirmed, the maintenance authentication unit 22 may perform the offline authentication or may start the videoconference program.

When the maintenance SIM card 122 is attached but the terminal 10 is in an offline state (No of S4-3), the maintenance authentication unit 22 determines whether the authentication of the service person is confirmed based on the client authentication information 24 read from the SIM card 122 (S4-5). If the client authentication information 24 of the SIM card 122 matches with the client authentication information 24 stored beforehand in the storage unit 1000, the maintenance authentication unit 22 determines that the authentication of the service person is confirmed. In this case, the maintenance control unit 23 starts the offline maintenance program 25. On the other hand, when the authentication of the service person is not confirmed, the maintenance authentication unit 22 may start the videoconference program or may switch OFF the power of the terminal 10.

Thus, in this embodiment, the maintenance functions executable on the terminal 10 may be altered based on whether the online authentication is performed or the offline authentication is performed when starting a maintenance operation on the terminal 10.

FIG. 20 is a sequence diagram for explaining an online authentication sequence in step S4-4 and an offline authentication sequence in step S4-5.

[Online Authentication]

In the case of the online authentication, the SIM card reading unit 21 transmits the client authentication information 24 read from the SIM card 122 to the maintenance authentication unit 22 (step S1.1).

The maintenance authentication unit 22 transmits the client authentication information 24 to the management system 50 via the transmitter/receiver unit 11 (step S1.2).

The terminal authentication unit 52 of the management system 50 determines whether authentication of the received client authentication information 24 is confirmed. When the authentication is confirmed, the terminal authentication unit 52 transmits an authentication result (OK) to the program supply system 90 (step S1.3).

The program supply system 90 acquires the IP address of the terminal 10 and transmits the online maintenance program 26 to the maintenance control unit 23 of the terminal 10 (step S1.4). In this case, the maintenance control unit 23 may start the online maintenance program 26.

The terminal authentication unit 52 transmits an authentication result (OK) to the maintenance authentication unit 22 of the terminal 10 (step S1.5).

In the event that the online maintenance program 26 is stored in the storage unit 1000 of the terminal 10, the online maintenance program 26 is not transmitted from the program supply system 90 to the terminal 10 in step S1.4.

[Offline Authentication]

In the case of the offline authentication, the SIM card reading unit 21 of the terminal 10 transmits the client authentication information 24 read from the SIM card 122 to the maintenance authentication unit 22 (step S2.1).

The maintenance authentication unit 22 determines whether authentication of the client authentication information 24 is confirmed. When the authentication is confirmed, the maintenance authentication unit 22 transmits an offline authentication result (OK) to the maintenance control unit 23 (step S2.2). In this case, the terminal 10 may start the offline maintenance program 25.

As described above, the transmission system 1 of this embodiment is able to alter the maintenance functions based on whether the online authentication is performed or the offline authentication is performed when starting a maintenance operation of the terminal 10.

The transmission system according to the invention is not limited to the transmission system 1 of this embodiment. The transmission management system 50 or the relay device 30 may store the online maintenance program. Further, another device, which is different from the management system 50, may be arranged to include the terminal authentication unit 52. Further, a plurality of management systems 50 may be utilized and the functions may be distributed over the management systems 50.

The configuration of the transmission system of this embodiment in which the management system 50, the terminal 10, the relay device 30 and the program supply system 90 are connected together via the network is a typical example. Further, various system configurations may be utilized according to the use or the purpose of the transmission system.

As described in the foregoing, it is possible to provide a transmission terminal which is able to alter maintenance functions executable on the transmission terminal based on whether an online authentication sequence is performed or an offline authentication sequence is performed when starting a maintenance operation on the transmission terminal.

The transmission terminal according to the invention is not limited to the specifically disclosed embodiments, and variations and modifications may be made without departing from the scope of the invention.

The present application is based upon and claims the benefit of priority of Japanese Patent Application No. 2012-225101, filed on Oct. 10, 2012, and Japanese Patent Application No. 2013-127512, filed on Jun. 18, 2013, the contents of which are incorporated herein by reference in their entirety.

What is claimed is:

1. A transmission terminal, comprising:
a detachable-storage interface to which a first storage is detachably attached, the first storage storing first information;
a second storage configured to store second information; and
circuitry configured to
determine whether the transmission terminal is connected to a network;
determine, when the transmission terminal is not connected to the network, whether an offline maintenance process is authorized according to the second information stored in the second storage and the first information read from the first storage;
maintain performance of the transmission terminal, when the offline maintenance process is determined to be authorized, by utilizing the offline maintenance process according to first instructions stored in the second storage;
transmit, when the transmission terminal is connected to the network, an authentication request to an authentication device connected to the network;
receive an authentication message from the authentication device in response to the transmitted authentication request;
maintain performance of the transmission terminal, when the authentication message indicates that an online maintenance process is authorized, by utilizing the online maintenance process according to second instructions received from the authentication device;
perform a videoconference process when the offline maintenance process is determined to be not authorized; and
perform the videoconference process when the authentication message indicates that an online maintenance process is not authorized.

2. The transmission terminal according to claim 1, wherein when the circuitry receives the second instructions from the authentication device, the circuitry stores the second instructions in the second storage.

3. The transmission terminal according to claim 1, wherein when the authentication message indicates that the online maintenance process is authorized, the circuitry replaces the first instructions stored in the second storage with the second instructions received from the authentication device.

4. The transmission terminal according to claim 1, wherein when the circuitry performs the offline maintenance process, the circuitry further performs an additional maintenance process according to additional instructions stored in the first storage.

5. A transmission system, comprising:
a detachable-storage interface to which a first storage is detachably attached, the first storage storing first information;
a second storage configured to store second information;

first circuitry configured to
  determine whether a transmission terminal is connected to a network;
  perform, when the transmission terminal is not connected to the network, a first authentication process to determine whether an offline maintenance process is authorized according to the second information stored in the second storage and the first information read from the first storage;
  maintain, when the offline maintenance process is determined to be authorized, performance of the transmission terminal by utilizing the offline maintenance process according to first instructions stored in the second storage;
  transmit, when the transmission terminal is connected to the network, an authentication request including the first information read from the first storage to an authentication device connected to the network;
  receive an authentication message from the authentication device in response to the transmitted authentication request;
  maintain, when the authentication message indicates that an online maintenance process is authorized, performance of the transmission terminal by utilizing the online maintenance process according to second instructions received from the authentication device;
  perform a videoconference process when the offline maintenance process is determined to be not authorized; and
  perform the videoconference process when the authentication message indicates that an online maintenance process is not authorized; and
second circuitry configured to
  determine, when the first information is received from the transmission terminal in response to the authentication request, whether the online maintenance process was determined to be authorized by the first circuitry according to the authentication message received from the authentication device; and
  transmit an authentication result to the transmission terminal.

6. A transmission method which is performed by a transmission terminal, the method comprising:
  reading first information stored in a first storage attached to a detachable-storage interface of the transmission terminal;
  determining, by circuitry of the transmission terminal, whether the transmission terminal is connected to a network;
  performing, by the circuitry when the transmission terminal is not connected to the network, an authentication process to determine whether an offline maintenance process is authorized according to second information stored in a second storage and the first information read from the first storage;
  maintaining, by the circuitry when the offline maintenance process is determined to be authorized, performance of the transmission terminal by utilizing the offline maintenance process according to first instructions stored in the second storage;
  transmitting, when the transmission terminal is connected to the network, an authentication request to an authentication device connected to the network;
  receiving an authentication message from the authentication device in response to the transmitted authentication request;
  maintaining, by the circuitry when the authentication message indicates that an online maintenance process is authorized, performance of the transmission terminal by utilizing the online maintenance process according to second instructions received from the authentication device;
  performing, by the circuitry, a videoconference process when the offline maintenance process is determined to be not authorized; and
  performing, by the circuitry, the videoconference process when the authentication message indicates that an online maintenance process is not authorized.

7. The transmission terminal according to claim 1, wherein the authentication request, transmitted by the circuitry to the authentication device, includes the first information.

8. The transmission terminal according to claim 1, wherein the circuitry is configured to perform the offline maintenance process when the authentication message indicates that an online maintenance process is not authorized.

9. The transmission terminal according to claim 1, wherein
  the circuitry performs the authentication process to determine whether an offline maintenance process is authorized by comparing the first information with the second information, and
  the circuitry determines that the offline maintenance process is authorized when the first information matches the second information.

10. The transmission terminal according to claim 7, wherein the authentication message, transmitted by the authentication device to the circuitry, is based on the first information.

11. The transmission system according to claim 5, wherein when the first circuitry receives the second instructions from the authentication device, the first circuitry stores the second instructions in the second storage.

12. The transmission system according to claim 5, wherein when the authentication message indicates that the online maintenance process is authorized, the first circuitry replaces the first instructions stored in the second storage with the second instructions received from the authentication device.

13. The transmission system according to claim 5, wherein when the first circuitry performs the offline maintenance process, the first circuitry performs an additional maintenance process according to additional instructions stored in the first storage.

14. The transmission system according to claim 5, wherein the authentication request, transmitted by the first circuitry to the authentication device, includes the first information.

15. The transmission system according to claim 14, wherein the authentication message, transmitted by the authentication device to the first circuitry, is based on the first information.

16. The transmission system according to claim 5, wherein
  the first circuitry performs the authentication process to determine whether an offline maintenance process is authorized by comparing the first information with the second information, and
  the first circuitry determines that the offline maintenance process is authorized when the first information matches the second information.

* * * * *